(12) United States Patent
Shadforth et al.

(10) Patent No.: US 12,484,806 B2
(45) Date of Patent: Dec. 2, 2025

(54) METHOD AND SYSTEM TO ASSESS DISEASE USING MULTI-SENSOR SIGNALS

(71) Applicant: Analytics For Life Inc., Toronto (CA)

(72) Inventors: Ian Shadforth, Morrisville, NC (US); Jonathan James Woodward, Toronto (CA); Shyamlal Ramchandani, Kingston (CA)

(73) Assignee: Analytics For Life Inc., Toronto (CA)

( * ) Notice: Subject to any disclaimer, the term of this patent is extended or adjusted under 35 U.S.C. 154(b) by 805 days.

(21) Appl. No.: 17/486,609

(22) Filed: Sep. 27, 2021

(65) Prior Publication Data
US 2022/0095955 A1 Mar. 31, 2022

Related U.S. Application Data

(60) Provisional application No. 63/083,371, filed on Sep. 25, 2020.

(51) Int. Cl.
  *A61B 5/11* (2006.01)
  *A61B 5/00* (2006.01)

(52) U.S. Cl.
  CPC .......... *A61B 5/1102* (2013.01); *A61B 5/0002* (2013.01); *A61B 5/7207* (2013.01); *A61B 5/7264* (2013.01)

(58) Field of Classification Search
  CPC .... A61B 5/1102; A61B 5/7207; A61B 5/7264
  See application file for complete search history.

(56) References Cited

U.S. PATENT DOCUMENTS 8,923,958 B2  12/2014 Gupta et al.
9,289,150 B1  3/2016 Gupta et al.
(Continued)

FOREIGN PATENT DOCUMENTS

EP  2285270  2/2011
EP  3769670  1/2021
(Continued)

OTHER PUBLICATIONS

Allen, J., "Photoplethysmography and its application in clinical physiological measurement," Physiological Measurement, vol. 28, No. 3, 2007, pp. R1-R39.
(Continued)

*Primary Examiner* — Eric D. Bertram
(74) *Attorney, Agent, or Firm* — Meunier Carlin & Curfman LLC

(57) ABSTRACT

The exemplified methods and systems (e.g., machine-learned systems) facilitate the acquisition of ballistocardiographic signals and the determination and use of ballistocardiographic signal related features, or parameters, in a model or classifier to estimate metrics associated with the physiological state of a subject, including for the presence or non-presence of a disease, medical condition, or indication of either. The estimated metric may be used to assist a physician or other healthcare provider in diagnosing the presence or non-presence and/or severity and/or localization of diseases, medical condition, or indication of either or in the treatment of said diseases or indicating conditions. In some embodiments, certain ballistocardiographic signals can also be used to remove motion artifacts from biophysical signals used for the estimation.

24 Claims, 15 Drawing Sheets

(56) References Cited

U.S. PATENT DOCUMENTS

| | | | |
|---|---|---|---|
| 9,408,543 B1 | 8/2016 | Gupta et al. | |
| 9,597,021 B1 | 3/2017 | Gupta et al. | |
| 9,655,536 B2 | 5/2017 | Gupta et al. | |
| 9,737,229 B1 | 8/2017 | Gupta et al. | |
| 9,910,964 B2 | 3/2018 | Burton et al. | |
| 9,955,883 B2 | 5/2018 | Gupta et al. | |
| 9,968,265 B2 | 5/2018 | Burton et al. | |
| 9,968,275 B2 | 5/2018 | Gupta et al. | |
| 10,039,468 B2 | 8/2018 | Gupta et al. | |
| 10,292,596 B2 | 5/2019 | Shadforth et al. | |
| 10,362,950 B2 | 7/2019 | Gupta et al. | |
| 10,542,897 B2 | 1/2020 | Gupta et al. | |
| 10,566,091 B2 | 2/2020 | Burton et al. | |
| 10,566,092 B2 | 2/2020 | Burton et al. | |
| 10,672,518 B2 | 6/2020 | Burton et al. | |
| 10,806,349 B2 | 10/2020 | Shadforth et al. | |
| 2006/0149139 A1* | 7/2006 | Bonmassar | A61B 5/291 600/595 |
| 2010/0210921 A1* | 8/2010 | Park | A61B 5/6829 600/301 |
| 2015/0141856 A1* | 5/2015 | Choi | A61B 5/318 600/509 |
| 2018/0249960 A1 | 9/2018 | Gupta et al. | |
| 2019/0000391 A1* | 1/2019 | De Haan | A61B 5/7207 |
| 2019/0026430 A1* | 1/2019 | Grouchy | G16B 40/20 |
| 2019/0026431 A1 | 1/2019 | Grouchy et al. | |
| 2019/0200893 A1 | 7/2019 | Grouchy et al. | |
| 2019/0214137 A1 | 7/2019 | Gupta et al. | |
| 2019/0313947 A1 | 10/2019 | Li et al. | |
| 2019/0365265 A1 | 12/2019 | Grouchy et al. | |
| 2019/0384757 A1 | 12/2019 | Garrett et al. | |
| 2020/0138306 A1 | 5/2020 | Li et al. | |
| 2020/0205739 A1 | 7/2020 | Garrett et al. | |
| 2020/0205745 A1 | 7/2020 | Khosousi et al. | |
| 2020/0211713 A1 | 7/2020 | Shadforth et al. | |
| 2020/0229724 A1 | 7/2020 | Gupta et al. | |
| 2020/0330050 A1* | 10/2020 | Peters | G16H 40/60 |
| 2020/0335217 A1 | 10/2020 | Burton et al. | |
| 2020/0397322 A1 | 12/2020 | Paak et al. | |
| 2020/0397324 A1 | 12/2020 | Paak et al. | |
| 2021/0212582 A1* | 7/2021 | Fathieh | A61B 5/7246 |

FOREIGN PATENT DOCUMENTS

| | | |
|---|---|---|
| EP | 3900610 A1 | 10/2021 |
| JP | 2018-130541 A | 8/2018 |
| WO | 2009/136306 | 11/2009 |
| WO | 2017/033164 | 3/2017 |
| WO | 2017/221221 | 12/2017 |
| WO | 2018/158749 | 9/2018 |
| WO | 2019/077414 | 4/2019 |
| WO | 2019/130272 | 7/2019 |
| WO | 2019/130273 | 7/2019 |
| WO | 2019/234587 | 12/2019 |
| WO | 2019/244043 | 12/2019 |
| WO | 2020/136569 | 7/2020 |
| WO | 2020/136570 | 7/2020 |
| WO | 2020/136571 | 7/2020 |
| WO | 2020/155169 A1 | 8/2020 |
| WO | 2020/254881 | 12/2020 |
| WO | 2020/254882 | 12/2020 |

OTHER PUBLICATIONS

Billingsley, P., "Ergodic Theory and Information," John Wiley & Sons, Inc., New York, 1965.

Chatterjee, A., "An introduction to the proper orthogonal decomposition," Current Science, vol. 78, No. 7, 2000, pp. 808-817.

Chen, T., et al., "XGBoost: A Scalable Tree Boosting System," Proceedings of the 22nd International Conference on Knowledge Discovery and Data Mining (KDD'16), ACM, 2016, pp. 785-794.

Dubin, D., "Rapid Interpretation of EKG's: An Interactive Course," Cover Publishing Company, 2000.

Ester, M., et al., "A Density-Based Algorithm for Discovering Clusters in Large Spatial Databases with Noise," Proceedings of the 2nd International Conference on Knowledge Discovery and Data Mining, 1996, pp. 226-231.

Etemadi, M., et al., "Wearable ballistocardiogram and seismocardiogram systems for health and performance," Journal of Applied Physiology, vol. 124, 2018, pp. 452-461.

"Executive Summary: Heart Disease and Stroke Statistics—2010 Update, A Report from the American Heart Association," Circulation, vol. 121, No. 7, 2010, pp. 948-954.

Fihn, S. D., et al., "2012 ACCF/AHA/ACP/AATS/PCNA/SCAI/STS Guideline for the Diagnosis and Management of Patients with Stable Ischemic Heart Disease: Executive Summary," Journal of the American College of Cardiology, vol. 60, No. 24, 2012, pp. 2564-2603.

Glass, L., "Synchronization and rhythmic processes in physiology," Nature, vol. 410, 2001, pp. 277-284.

Glass, L., et al., "Theory of Heart: Biomechanics, Biophysics, and Nonlinear Dynamics of Cardiac Function," Springer Science & Business Media, 2012.

Glass, L., et al., "Time Delays, Oscillations, and Chaos in Physiological Control Systems," Mathematical Biosciences, vol. 90, Issues 1-2, 1988, pp. 111-125.

Goldberger, A. L., et al., "Chaos and Fractals in Human Physiology," Scientific American, vol. 262, No. 2, 1990, pp. 43-49.

Goldberger, A. L. "Nonlinear dynamics, Fractals and Chaos: Applications to Cardiac Electrophysiology," Annals of Biomedical Engineering, vol. 18, No. 2, 1990, pp. 195-198.

Grassberger, P., et al., "Estimation of the Kolmogorov entropy from a chaotic signal," Rapid Communications, Physical Review A, vol. 28, No. 4, 1983, pp. 2591-2593.

Hansson, G. K., "Inflammation, atherosclerosis, and coronary artery disease," The New England Journal of Medicine, vol. 352, No. 16, 2005, pp. 1685-1695.

He, D. D., Ph.D., A Wearable Heart Monitor at the Ear using Ballistocardiogram (BCG) and Electrocardiogram (ECG) with a Nanowatt ECG Heartbeat Detection Circuit, Thesis, Massachusetts Institute of Technology, 2013, 137 pages.

Jahmunah, V., et al., "Automated detection of schizophrenia using nonlinear signal processing methods," Artificial Intelligence in Medicine, vol. 100, 2019, 18 pages.

Kern, M. J., et al., "Hemodynamic Rounds Series II: The LVEDP," Catheterization and Cardiovascular Diagnosis, vol. 44, No. 1, 1998, pp. 70-74.

Kolmogorov, A. N., "On the Entropy per Unit of Time as a Metric Invariant of Automorphisms," C.R. (Doklady) Russian Academy of Sciences, No. 4, vol. 124, 1959, 3 pages.

Kononenko, I., "Machine Learning for Medical Diagnosis: History, State of the Art and Perspective," Artificial Intelligence in Medicine, vol. 23, No. 1, 2001, 25 pages.

Levine, G. N., et al., "2011 ACCF/AHA/SCAI Guideline for Percutaneous Coronary Intervention: Executive Summary," Journal of the American College of Cardiology, vol. 58, No. 24, 2011, pp. 2550-2583.

Mensah, G. A., et al., "An Overview of Cardiovascular Disease Burden in the United States," Health Affairs, vol. 26, No. 1, 2007, pp. 38-48.

Mielniczuk, L. M., et al., "Left Ventricular End-Diastolic Pressure and Risk of Subsequent Heart Failure in Patients Following an Acute Myocardial Infarction," Congestive Heart Failure, vol. 13, No. 4, 2007, pp. 209-214.

Mobley, B. A., et al., "Predictions of coronary artery stenosis by artificial neural network," Artificial Intelligence in Medicine, vol. 18, No. 3, 2000, pp. 187-203.

Ommen, S. R., et al., "Clinical Utility of Doppler Echocardiography and Tissue Doppler Imaging in the Estimation of Left Ventricular Filling Pressures, A Comparative Simultaneous Doppler-Catheterization Study," Circulation, vol. 102, No. 15, 2000, pp. 1788-1794.

Owis, M. I., et al., "Study of features based on nonlinear dynamical modeling in ECG arrhythmia detection and classification," IEEE Transactions on Biomedical Engineering, vol. 49, No. 7, 2002, pp. 733, 736.

(56) References Cited

OTHER PUBLICATIONS

Pan, J., et al., "A Real-Time QRS Detection Algorithm," IEEE Transactions on Biomedical Engineering, vol. BME-32, No. 3, 1985, pp. 230-236.

Park, J.-H., et al., "Use and Limitations of E/e' to Assess Left Ventricular Filling Pressure by Echocardiography," Journal of Cardiovascular Ultrasound, vol. 19, No. 4, 2011, pp. 169-173.

Patel, V. L., et al., "The Coming of Age of Artificial Intelligence in Medicine," Artificial Intelligence in Medicine, vol. 46, No. 1, 2009, pp. 5-17.

Pedregosa, F., et al., "Scikit-learn: Machine Learning in Python," Journal of Machine Learning Research, vol. 12, 2011, pp. 2825-2830.

Pikovsky, A., et al., "Synchronization: A Universal Concept in Nonlinear Sciences," Series No. 12, Cambridge University Press, 2003.

Reddy, Y. N., et al., "Comparing Pulmonary Arterial Wedge Pressure and Left Ventricular End Diastolic Pressure for Assessment of Left-Sided Filling Pressures," JAMA Cardiology, vol. 3, No. 6, 2018, pp. E1-E2.

Russo, J. J., et al., "Left Ventricular Unloading During Extracorporeal Membrane Oxygenation in Patients with Cardiogenic Shock," Journal of the American College of Cardiology, vol. 73, No. 6, 2019, pp. 654-662.

Salem, R., et al., "Left ventricular end-diastolic pressure is a predictor of mortality in cardiac surgery independently of left ventricular ejection fraction," British Journal of Anaesthesia, vol. 97, No. 3, 2006, pp. 292-297.

Sauer, T., et al., "Embedology," Journal of Statistical Physics, vol. 65, Nos. 3-4, 1991, pp. 579-616.

Strogatz, S. H., "Nonlinear Dynamics and Chaos: With Applications to Physics, Biology, Chemistry, and Engineering," CRC Press, 2018.

Tai, A. M., et al., "Machine learning and big data: Implications for disease modeling and therapeutic discovery in psychiatry," Artificial Intelligence in Medicine, vol. 99, 2019, 11 pages.

Theiler, J., "Efficient Algorithm for Estimating the Correlation Dimension from a Set of Discrete Points," Physical Review A, vol. 36, No. 9, 1987, pp. 4456-4462.

Voss, A., et al., "Methods derived from nonlinear dynamics for analysing heart rate variability," Philosophical Transactions of the Royal Society A: Mathematical, Physical and Engineering Sciences, vol. 367, No. 1887, 2008, pp. 277-296.

Wiens, A., et al., "Wearable Ballistocardiography: Preliminary Methods for Mapping Surface Vibration Measurements to Whole Body Forces," Conference Proceedings of the IEEE Engineering in Medicine and Biology Society, 2014, pp. 5172-5175.

Wolf, J. B., et al., "Determining Lyapunov Exponents from a Time Series," Physica D: Nonlinear Phenomena, vol. 16, No. 3, 1985, pp. 285-317.

Zou, H., et al., "Regularization and variable selection via the elastic net," Journal of the Royal Statistical Society: Series B (Statistical Methodology), vol. 67, Part 2, 2005, pp. 301-320.

International Search Report and Written Opinion, dated Dec. 22, 2021, received in connection with corresponding International Patent Application No. PCT/IB2021/058810.

Communication Pursuant to Rule 164(1) issued Dec. 13, 2024 in corresponding European Application No. 21871815.3, 17 pages.

Extended European Search Report issued Mar. 6, 2025 in corresponding European Application No. 21871815.3, 14 pages.

Japanese Office Action issued Jul. 10, 2025 in corresponding Application No. 2023-519002, 14 pages.

* cited by examiner

METHOD AND SYSTEM TO ASSESS DISEASE USING MULTI-SENSOR SIGNALS

RELATED APPLICATION

This application claims priority to, and the benefit of, U.S. Provisional Patent Application No. 63/083,371, filed Sep. 25, 2021, entitled "Method and System to Assess Disease Using Multi-Sensor Signals," which is hereby incorporated by reference in its entirety.

FIELD OF THE INVENTION

The present disclosure generally relates to methods and systems for characterizing one or more physiological systems and their associated functions, activities, and abnormalities. More specifically, in an aspect, the present disclosure relates to non-invasive methods that utilize, for example, cardiac, ballistocardiogram, and photoplethysmographic-related measurements, alone or in conjunction with other types of measurements of physiological phenomena and systems, to estimate and/or detect the presence, non-presence, severity, and/or localization, of cardiovascular, pulmonary, and cardiopulmonary disease, processes or conditions, among others described herein using multi-sensor signals that include ballistocardiographic signals.

BACKGROUND

There are numerous methods and systems for assisting a healthcare professional in diagnosing disease. Some of these involve the use of invasive or minimally invasive techniques, radiation, exercise or stress, or pharmacological agents, sometimes in combination, with their attendant risks and other disadvantages.

Diastolic heart failure, a major cause of morbidity and mortality, is defined as symptoms of heart failure in a patient with preserved left ventricular function. It is characterized by a stiff left ventricle with decreased compliance and impaired relaxation leading to increased end-diastolic pressure in the left ventricle, which is measured through left heart catheterization. The current clinical standard of care for diagnosing pulmonary hypertension (PH) and for pulmonary arterial hypertension (PAH), in particular, involves a cardiac catheterization of the right side of the heart that directly measures the pressure in the pulmonary arteries. Coronary angiography is the current standard of care used to assess coronary arterial disease (CAD) as determined through the coronary lesions described by a treating physician. Non-invasive imaging systems such as magnetic resonance imaging and computed tomography require specialized facilities to acquire images of blood flow and arterial blockages of a patient that are reviewed by radiologists.

It is desirable to have a system that can assist healthcare professionals in the diagnosis of cardiac disease and various other diseases and conditions without the aforementioned disadvantages.

SUMMARY

The exemplified methods and systems are disclosed that facilitate the recording of ballistocardiographic signals and the engineering and use of features or parameters from these ballistocardiographic signals, alone or in combination with other biophysical signals such as cardiac/biopotential signals and/or photoplethysmography signals that are acquired, in some embodiments, non-invasively from surface sensors placed on a patient while the patient is at rest. For example, synchronous measurements of ballistocardiographic signals via accelerometers embedded within the electrode snaps of a lead set of other biophysical signals such as cardiac signals can be used to measure voltage gradients in combination with acceleration signals. Ballistocardiographic features or parameters, and other features, can be generated to evaluate and/or quantify beat-to-beat variations of the ballistocardiogram signal in comparison to another biophysical signal; quantify ballistocardiogram dynamical characteristics such as Lyapunov exponent, correlation dimension, entropy, mutual information, and correlation; quantify linear characteristics such as peak amplitudes, peak-to-peak distances, and angles between registrations points in the ballistocardiographic signal and/or 3D vectors generated among the ballistocardiographic signal, a first derivative of the ballistocardiographic signal, and a second derivative of the ballistocardiographic signal.

The features or parameters can be ultimately used in a trained model or classifier (e.g., a trained machine-learned classifier) to estimate metrics associated with the physiological state of a patient, including for the presence or non-presence of a disease, medical condition, or an indication of either. The estimated metric may be used to assist a physician or other healthcare provider in diagnosing the presence or non-presence and/or severity and/or localization of diseases or conditions or in the treatment of said diseases or conditions.

The estimation or determined likelihood of the presence or non-presence of a disease, condition, or indication of either can supplant, augment, or replace other evaluation or measurement modalities for the assessment of a disease or medical condition. In some cases, a determination can take the form of a numerical score and related information.

More specifically, the exemplified methods and systems can perform various analyses to estimate for the presence, non-presence, severity, and/or localization (where applicable) of abnormal cardiovascular conditions, disease, or indication of either, including, for example, but not limited to, coronary artery disease, abnormal left ventricular end-diastolic pressure disease (LVEDP), pulmonary hypertension and subcategories thereof, heart failure (HF), among others as discussed herein. In the context of cardiovascular and respiratory systems, examples of diseases and conditions to which such metrics can relate include, for example: (i) heart failure (e.g., left-side or right-side heart failure; heart failure with preserved ejection fraction (HFpEF)), (ii) coronary artery disease (CAD), (iii) various forms of pulmonary hypertension (PH) including without limitation pulmonary arterial hypertension (PAH), (iv) abnormal left ventricular ejection fraction (LVEF), and various other diseases or conditions. An example indicator of certain forms of heart failure is the presence or non-presence of elevated or abnormal left-ventricular end-diastolic pressure (LVEDP). An example indicator of certain forms of pulmonary hypertension is the presence or non-presence of elevated or abnormal mean pulmonary arterial pressure (mPAP). Other features or parameters as described herein can be generated from ballistocardiogram signals alone or in conjunction with other biophysical signals.

As used herein, the term "feature" generally refers to an individual measurable property or characteristic of a phenomenon being observed in the context of machine learning and pattern recognition. A feature is defined by analysis and may be determined in groups in combination with other features from a common model or analytical framework.

As used herein, "metric" refers to an estimation or likelihood of the presence, non-presence, severity, and/or localization (where applicable) of one or more diseases, conditions, or indication(s) of either, in a physiological system or systems. Notably, the exemplified methods and systems can be used in certain embodiments described herein to acquire biophysical signals and/or to otherwise collect data from a patient and to evaluate those signals and/or data in signal processing and classifier operations to evaluate for a disease, condition, or indicator of one that can supplant, augment, or replace other evaluation modalities via one or more metrics. In some cases, a metric can take the form of a numerical score and related information.

In addition, for use explicitly for diagnostic, in some embodiments, the ballistocardiogram signals are used to assess for gross patient movements that may interfere with the collection of other biophysical signals. In other embodiments, the ballistocardiogram signals are used to assess a measure of the vibrations caused by the beating of the heart (SCG/BCG) that can be removed from the subsequent analyses. The ballistocardiogram signals, in yet further embodiments, can be used to measure physical motion such as to improve the fidelity of the biophysical signals such as the cardiac signal to remove artifacts in the signal caused by, for example, changes in the half-cell potential of the electrodes. To this end, the ballistocardiogram signals may be used to enhance the modality acquisitions of other biophysical signals.

The term "ballistocardiogram" refers to a measure that reflects the flow of blood through the body, e.g., as acquired using a wearable device. One subgroup of ballistocardiogram sensors is referred to as seismocardiogram (SCG) sensors, which are more directed to a measure of vibrations as recorded by sensors mounted close to the heart. As used herein, the terms ballistocardiogram and seismocardiogram are used interchangeably. The terms ballistocardiogram and ballistocardiographic are also used interchangeably. In some embodiments, ballistocardiogram signals may be acquired by external equipment, e.g., bed or surface, that measures the change in body weight, e.g., as blood moves back and forth in the longitudinal direction between head and feet. In such embodiments, the volume of blood in each location may change dynamically and be reflected in the weight measured at each location on the bed.

The term "ballistocardiographic signal," as used herein, refers to a signal or group of signals that generally reflect the flow of blood through the entire body that may be observed through vibration, acoustic, movement, or orientation. In some embodiments, ballistocardiographic signals are acquired by wearable devices, such as vibration, acoustic, movement, or orientation-based seismocardiogram (SCG) sensors, which can measure the body's vibrations or orientation as recorded by sensors, e.g., accelerometer, pressure, acoustic sensors, mounted close to the heart. Seismocardiogram sensors are generally used to acquire "seismocardiogram," which is used interchangeably with the term "ballistocardiogram" herein. In other embodiments, ballistocardiographic signals may be acquired by external equipment, e.g., bed or surface-based equipment that measures phenomena such as a change in body weight as blood moves back and forth in the longitudinal direction between the head and feet. In such embodiments, the volume of blood in each location may change dynamically and be reflected in the weight measured at each location on the bed as well as the rate of change of that weight.

The term "biophysical signal" as used herein includes but is not limited to one or more cardiac signal(s), neurological signal(s), ballistocardiographic signal(s), and/or photoplethysmographic signal(s), but it also encompasses more broadly any physiological signal from which information may be obtained. The term "another biophysical signal" refers to a different type of biophysical signal than the biophysical signal that is explicitly referenced. Not intending to be limited by example, one may classify biophysical signals into types or categories that can include, for example, electrical (e.g., certain cardiac and neurological system-related signals that can be observed, identified, and/or quantified by techniques such as the measurement of voltage/potential (e.g., biopotential), impedance, resistivity, conductivity, current, etc. in various domains such as time and/or frequency), magnetic, electromagnetic, optical (e.g., signals that can be observed, identified and/or quantified by techniques such as reflectance, interferometry, spectroscopy, absorbance, transmissivity, visual observation, photoplethysmography, and the like), acoustic, chemical, mechanical (e.g., signals related to fluid flow, pressure, motion, vibration, displacement, strain), thermal, and electrochemical (e.g., signals that can be correlated to the presence of certain analytes, such as glucose). Biophysical signals may in some cases be described in the context of a physiological system (e.g., respiratory, circulatory (cardiovascular, pulmonary), nervous, lymphatic, endocrine, digestive, excretory, muscular, skeletal, renal/urinary/excretory, immune, integumentary/exocrine and reproductive systems), one or more organ system(s) (e.g., signals that may be unique to the heart and lungs as they work together), or in the context of tissue (e.g., muscle, fat, nerves, connective tissue, bone), cells, organelles, molecules (e.g., water, proteins, fats, carbohydrates, gases, free radicals, inorganic ions, minerals, acids, and other compounds), elements, and their subatomic components. Unless stated otherwise, the term "biophysical signal acquisition" generally refers to any passive or active means of acquiring a biophysical signal from a physiological system, such as a mammalian or non-mammalian organism. Passive and active biophysical signal acquisition generally refers to the observation of natural or induced electrical, magnetic, optical, and/or acoustics emittance of the body tissue. Non-limiting examples of passive and active biophysical signal acquisition means include, e.g., voltage/potential, current, magnetic, optical, acoustic, and other non-active ways of observing the natural emittance of the body tissue, and in some instances, inducing such emittance. Non-limiting examples of passive and active biophysical signal acquisition means include, e.g., ultrasound, radio waves, microwaves, infrared and/or visible light (e.g., for use in pulse oximetry or photoplethysmography), visible light, ultraviolet light, and other ways of actively interrogating the body tissue that does not involve ionizing energy or radiation (e.g., X-ray). An active biophysical signal acquisition may involve excitation-emission spectroscopy (including, for example, excitation-emission fluorescence). The active biophysical signal acquisition may also involve transmitting ionizing energy or radiation (e.g., X-ray) (also referred to as "ionizing biophysical signal") to the body tissue. Passive and active biophysical signal acquisition means can be performed in conjunction with invasive procedures (e.g., via surgery or invasive radiologic intervention protocols) or non-invasively (e.g., via imaging, ablation, heart contraction regulation (e.g., via pacemakers), catheterization, etc.).

The methods and systems described in the various embodiments herein are not so limited and may be utilized in any context of another physiological system or systems, organs, tissue, cells, etc., of a living body. By way of example only, two biophysical signal types that may be useful in the cardiovascular context include cardiac/biopotential signals that may be acquired via conventional electrocardiogram (ECG/EKG) equipment, bipolar wide-band biopotential (cardiac) signals that may be acquired from other equipment such as those described herein, and signals that may be acquired by various plethysmographic techniques, such as, e.g., photoplethysmography. In another example, the two biophysical signal types can be further augmented by ballistocardiographic techniques.

The term "photoplethysmographic signal" as used herein refers to one or more signals or waveforms acquired from optical sensors that correspond to measured changes in light absorption by oxygenated and deoxygenated hemoglobin, such as light having wavelengths in the red and infrared spectra. Photoplethysmographic signal(s), in some embodiments, include a raw signal(s) acquired via a pulse oximeter or a photoplethysmogram (PPG). In some embodiments, photoplethysmographic signal(s) are acquired from off-the-shelf, custom, and/or dedicated equipment or circuitries that are configured to acquire such signal waveforms for the purpose of monitoring health and/or diagnosing disease or abnormal conditions. The photoplethysmographic signal(s) typically include a red photoplethysmographic signal (e.g., an electromagnetic signal in the visible light spectrum most dominantly having a wavelength of approximately 625 to 740 nanometers) and an infrared photoplethysmographic signal (e.g., an electromagnetic signal extending from the nominal red edge of the visible spectrum up to about 1 mm), though other spectra such as near-infrared, blue and green may be used in different combinations, depending on the type and/or mode of PPG being employed.

The term "synchronicity" refers to a physiological relationship between one or more signals of a first modality (e.g., ballistocardiogram signals) and a second modality (e.g., photoplethysmographic signals and/or cardiac signals). For example, the cardiac electrical activity, as detected via electrodes or sensors of a measurement system, stimulates the muscle to cause the left ventricle to eject oxygenated blood to the body. Some of this blood then travels to the fingertip, where its oxygenation level is detected via one or more photoplethysmographic sensors. The time lag between the maximal left ventricular electrical activity (e.g., corresponding to the R-peak in the cardiac signal) and the peak oxygenation in the fingertip may be defined as a "pulse transit time" (PTT), which is a temporal measurement. PTT can change from beat to beat (of the heart) because of the physiological synchrony between the cardiac electrical activity (as measured using the cardiac biopotential signal) and the pulsatile oxygen perfusion (as measured using the PPG signal) can change. The Poincaré techniques and corresponding features disclosed herein characterize, among other things, that variation in synchrony.

The term "simultaneously acquired" refers to an acquired data point of a first modality (e.g., a channel of a cardiac signal) at time n having a corresponding data point at time n for a second modality (e.g., a channel of a photoplethysmographic signal), or even a third or more modalities. The timing, or temporal precision, of this multiple modality signal acquisition, is typically dictated by, e.g., the signal acquisition device circuitry, firmware, etc. For embodiments disclosed herein, a high degree of temporal precision (e.g., minimal temporal skew) between or among signals acquired from different modalities. In some embodiments, simultaneous signal/data point acquisition for different modalities is performed, e.g., via one or more circuits located in a single integrated hardware component or signal acquisition device, or even within a single printed circuit board or component therein. In other embodiments, simultaneous signal/data point acquisition for different modalities is performed via one or more circuits located on different signal acquisition devices having a common/shared clock, signal acquisition trigger, and/or other components. Moreover, various configurations of circuitry, other hardware, accessories (such as leads, electrodes, PPG sensors, etc.) within and among signal acquisition devices may accomplish this temporal precision.

A method is disclosed to remove motion-associated artifacts from an acquired measurement signal, wherein the acquired measurement signal is used to non-invasively assess a cardiac disease state or abnormal cardiac condition of a subject, the method comprising: obtaining, by one or more processors, a first biophysical signal data set of the subject comprising a first photoplethysmographic signal and a second photoplethysmographic signal or a cardiac signal; obtaining, by the one or more processors, a second biophysical signal data set of the subject associated with a ballistocardiogram signal, wherein the ballistocardiogram signal are temporally and spatially acquired with respect to the first photoplethysmographic signal, the second photoplethysmographic signal, or the cardiac signal; determining, by the one or more processors, a filtered biophysical-signal data set of the first biophysical signal data set by removing an estimated motion signal (e.g., estimated gross subject's movements, estimated vibrations from the beating of the subject's heart, or estimated respiration motion or other physical movement) determined using the ballistocardiogram signal; determining, by the one or more processors, via a trained classifier model, an estimated value related to a presence of the disease state, abnormal condition, or indication of either; and outputting, via a report and/or display, the estimated value related to the presence of the disease state, abnormal condition, or indication of either, wherein the output is made available to a healthcare provider to assist in a diagnosis of the disease state, abnormal condition, or indication of either, or to direct treatment of disease state, abnormal condition, or indication of either.

In some embodiments, the estimated motion signal comprises an estimated gross movement of the subject (e.g., via clustering or statistical analysis).

In some embodiments, the method further includes determining, by the one or more processors, estimated gross subject's movements during the acquisition of the first biophysical signal data set, wherein the estimated gross subject's movement is used to reject a portion of the acquired first biophysical signal data set having the estimated gross subject's movements above a pre-defined threshold value.

In some embodiments, the estimated motion signal comprises assessed vibrations associated with the heartbeats of the subject.

In some embodiments, the estimated motion signal is determined by generating a template-signal vector data set characteristic of a representative motion signal pattern of the ballistocardiogram signal (e.g., via clustering or statistical analysis).

In some embodiments, the estimated motion signal (e.g., estimated respiration motion of the subject) is used to assess a change in cell potential of respective electrodes used to acquire the cardiac signal.

In some embodiments, the subsequent analysis to determine the estimated value for the presence of the cardiac disease state or abnormal cardiac condition comprises determining, by the one or more processor, one or more synchronicity dynamical features including a first synchronicity feature and a second synchronicity feature, wherein the first and second synchronicity features each characterizes, via a statistical- or dynamical-analysis assessment, one or more synchronicity dynamical properties across multiple heart cycles between (i) the first biophysical signal data set associated with the first and second photoplethysmographic signals or cardiac signal and (ii) the second biophysical signal data set associated with the ballistocardiogram signal.

In some embodiments, the statistical- or dynamical-analysis assessment is selected from the group consisting of a statistical- or dynamical-analysis assessment of values of the ballistocardiogram signal at a registration point defined by one or both the first photoplethysmographic signal and the second photoplethysmographic signal; a statistical- or dynamical-analysis assessment of values of the ballistocardiogram signal at a registration point defined by the cardiac signal; a statistical- or dynamical-analysis assessment of values of one of the first photoplethysmographic signal or the second photoplethysmographic signal at a landmark (e.g., maximum peak) defined in the ballistocardiogram signal; a statistical- or dynamical-analysis assessment of values of the cardiac signal at a landmark (e.g., maximum peak) defined in the ballistocardiogram signal; a statistical- or dynamical-analysis assessment of time intervals between a) a first set of landmarks defined in the ballistocardiogram and b) a second set of landmarks defined in the cardiac signal; a statistical- or dynamical-analysis assessment of time intervals between a) a first set of landmarks defined between the first photoplethysmographic signal and the second photoplethysmographic signal and b) a second set of landmarks defined in the ballistocardiogram signal; a statistical- or dynamical-analysis assessment of phase relations between (i) periods of the ballistocardiogram signal and (ii) periods of the cardiac signal; and a statistical- or dynamical-analysis assessment of phase relations between (i) periods of one of the first or second photoplethysmographic signals and (ii) periods of the ballistocardiogram signal.

In some embodiments, the subsequent analysis to determine the estimated value for the presence of the cardiac disease state or abnormal cardiac condition comprises determining, by the one or more processors, one or more dynamical features, including a first dynamical feature and a second dynamical feature, wherein the first and second dynamical features each characterizes, via a statistical- or dynamical-analysis assessment, one or more dynamical properties across multiple heart cycles of the second biophysical signal data set associated with the ballistocardiogram signals.

In some embodiments, the method further includes determining, by the one or more processors, a Poincaré map of the obtained biophysical signal data set; determining, by the one or more processors, a geometric shape object (e.g., an alpha shape object) of the Poincaré map; and determining, by the one or more processors, one or more geometric properties (e.g., a density value of the geometric shape object, a convex surface area value of the geometric shape object, a perimeter value of the geometric shape object, a porosity value of the geometric shape object, a void area value of the geometric shape object) of the geometric shape object, wherein the one or more determined geometric properties is used in the determination of the estimated value for the presence, non-presence, localization, and/or severity of the disease or condition.

In some embodiments, the ballistocardiogram signal is acquired via an accelerometer co-located on a sensor associated with the cardiac signal.

In some embodiments, the ballistocardiogram signal is acquired via an acoustic sensor co-located on a sensor associated with the cardiac signal.

In some embodiments, the ballistocardiogram signal is acquired via a pressure sensor co-located on a sensor associated with the cardiac signal.

In some embodiments, the method further includes obtaining, by the one or more processors, a third biophysical signal data set of the subject associated with a second ballistocardiogram signal (e.g., accelerometer measurement, acoustic measurement, or pressure measurement), wherein the second ballistocardiogram signal are temporally and spatially acquired with respect to cardiac signal.

In some embodiments, the determined estimated value for the presence of the disease state or abnormal condition comprises an assessed indication or estimate of at least one of presence, non-presence, and severity of elevated or abnormal left ventricular end-diastolic pressure (LVEDP).

In some embodiments, the disease state or condition is selected from the group consisting of coronary artery disease, pulmonary hypertension, pulmonary arterial hypertension, pulmonary hypertension due to left heart disease, rare disorders that lead to pulmonary hypertension, left ventricular heart failure or left-sided heart failure, right ventricular heart failure or right-sided heart failure, systolic heart failure, diastolic heart failure, ischemic heart disease, and arrhythmia.

In another aspect, a method is disclosed for non-invasively estimating a disease state, abnormal condition, or indication of either, of a subject, the method comprising obtaining, by one or more processors, a first biophysical signal data set of the subject comprising (i) a photoplethysmographic signal and/or (ii) a cardiac signal; obtaining, by the one or more processors, a second biophysical signal data set of the subject associated with a ballistocardiogram signal, wherein the ballistocardiogram signal, the photoplethysmographic signal, and the cardiac signal concurrently are acquired via surface sensors placed on the subject; determining, by the one or more processors, over at least a portion of the multiple cardiac cycles, a plurality of registration points in the first biophysical signal data set; determining, by the one or more processors, a value of a feature or parameter comprising (i) a geometric parameter of a Poincaré map or (ii) a statistical parameter of a histogram, wherein the Poincaré map or the histogram is defined by the values of the second biophysical signal data set at the plurality of first biophysical signal data set; determining, by the one or more processors, via a trained classifier model, an estimated value related to a presence of the disease state, abnormal condition, or indication of either; and outputting, via a report and/or display, the estimated value related to the presence of the disease state, abnormal condition, or indication of either, wherein the output is made available to a healthcare provider to assist in a diagnosis of the disease state, abnormal condition, or indication of either, or to direct treatment of disease state, abnormal condition, or indication of either.

In another aspect, a method is disclosed for non-invasively estimating a disease state, abnormal condition, or indication of either, of a subject, the method comprising obtaining, by the one or more processors, a biophysical signal data set of the subject associated with a ballistocardiographic signal, wherein the ballistocardiographic signal is acquired via surface sensors placed on the subject; determining, by the one or more processors, a value of a ballistocardiographic feature or parameter using the biophysical signal data set; determining, by the one or more processors, via a trained classifier model, an estimated value related to a presence of the disease state, abnormal condition, or indication of either; and outputting, via a report and/or display, the estimated value related to the presence of the disease state, abnormal condition, or indication of either, wherein the output is made available to a healthcare provider to assist in a diagnosis of the disease state, abnormal condition, or indication of either, or to direct treatment of disease state, abnormal condition, or indication of either.

In some embodiments, the ballistocardiographic feature or parameter includes a quantification of beat-to-beat variations of the ballistocardiogram signal in comparison to another biophysical signal.

In some embodiments, the ballistocardiographic feature or parameter includes a quantification of dynamical characteristic including at least one of Lyapunov exponent, correlation dimension, entropy, mutual information, and correlation in relation to another biophysical signal.

In some embodiments, the ballistocardiographic feature or parameter includes a quantification of linear characteristic including at least one of peak amplitudes, peak-to-peak distances, and angles between registrations points in the ballistocardiographic signal.

In some embodiments, the ballistocardiographic feature or parameter includes a quantification of linear characteristic comprising 3D vector among the ballistocardiographic signal, a first derivative of the ballistocardiographic signal, and a second derivative of the ballistocardiographic signal.

In some embodiments, the ballistocardiographic feature or parameter includes a quantification of at least one of the power spectrum, frequency content, coherence of the ballistocardiographic signal.

In another aspect, a system is disclosed comprising a processor; and a memory having instructions stored thereon, wherein the instructions, when executed by the processor, cause the processor to perform any of the above-discussed methods.

In another aspect, a non-transitory computer-readable medium is disclosed comprising instructions stored thereon, wherein execution of the instructions by a processor causes the processor to perform any of the above-discussed methods.

In another aspect, a system is disclosed comprising a photoplethysmographic acquisition circuit configured to acquire, from a plurality of first sensors, a plurality of photoplethysmographic signal waveforms each associated with a respective photodiode output; a voltage gradient acquisition circuit configured to acquire from a plurality of second sensors, a plurality of cardiac signal waveforms at least at a plurality of pre-defined orthogonal locations on a torso of a subject; and a ballistocardiogram acquisition circuit configured, from a plurality of third sensors, a plurality of ballistocardiogram signal waveforms each spatially and temporally synchronized to the plurality of photoplethysmographic signal waveforms or the plurality of cardiac signal waveforms.

In some embodiments, the system further includes a housing, wherein the photoplethysmographic acquisition circuit, the voltage gradient acquisition circuit, and the ballistocardiogram acquisition circuit are located in the housing.

In some embodiments, the system further includes the plurality of third sensors comprising a plurality of multi-axis accelerometers, wherein each of the plurality of third sensors is operatively coupled (e.g., over a cable or through a wireless tether) to the ballistocardiogram acquisition circuit and comprises a multi-axis accelerometer of the plurality of multi-axis accelerometer, wherein each of the plurality of multi-axis accelerometers is co-located to a respective first sensor of the plurality of first sensors or to a respective second sensor of the plurality of second sensors.

In some embodiments, each of the plurality of multi-axis accelerometers is co-located to the respective first sensor comprising a PPG sensor.

In some embodiments, each of the plurality of multi-axis accelerometers is co-located to the respective second sensor comprising a voltage gradient sensing electrode (e.g., enclosed within each electrode snap of a lead-set associated with the voltage gradient sensing electrode).

In some embodiments, the system further includes the plurality of third sensors comprising a plurality of acoustic sensors, wherein each of the plurality of third sensors is operatively coupled (e.g., over a cable or through a wireless tether) to the ballistocardiogram acquisition circuit and comprises an acoustic sensor of the plurality of acoustic sensors, wherein each of the plurality of acoustic sensors is co-located to a respective first sensor of the plurality of first sensors or to a respective second sensor of the plurality of second sensors.

In some embodiments, each of the plurality of acoustic sensors is co-located to the respective first sensor comprising a PPG sensor.

In some embodiments, each of the plurality of multi-axis accelerometers is co-located to the respective second sensor comprising a voltage gradient sensing electrode (e.g., enclosed within each electrode snap of a lead-set associated with the voltage gradient sensing electrode).

In some embodiments, the system further includes the plurality of third sensors comprising a plurality of pressure sensors, wherein each of the plurality of third sensors is operatively coupled (e.g., over a cable or through a wireless tether) to the ballistocardiogram acquisition circuit and comprises a pressure sensor of the plurality of pressure sensors, wherein each of the plurality of acoustic sensor is co-located to a respective second sensor of the plurality of second sensors (e.g., in a gel of the voltage gradient sensing electrode).

In some embodiments, each of the plurality of third sensors is connected to a return conductor and a power supply conductor that each runs through the lead-set associated with the voltage gradient sensing electrode.

In some embodiments, the power supply conductor and return conductor of each respective lead-set encapsulate a first isolated signal conductor associated with a respective third sensor.

In some embodiments, the power supply conductor and return conductor of each respective lead-set encapsulate a second isolated signal conductor associated with a respective voltage gradient sensing electrode.

BRIEF DESCRIPTION OF THE DRAWINGS

The accompanying drawings, which are incorporated in and constitute a part of this specification, illustrate embodiments and, together with the description, serve to explain the principles of the methods and systems.

Embodiments of the present invention may be better understood from the following detailed description when read in conjunction with the accompanying drawings. Such embodiments, which are for illustrative purposes only, depict novel and non-obvious aspects of the invention. The drawings include the following figures.

DETAILED SPECIFICATION

Each and every feature described herein, and each and every combination of two or more of such features is included within the scope of the present invention provided that the features included in such a combination are not mutually inconsistent.

While the present disclosure is directed to the practical assessment of biophysical signals, e.g., raw or pre-processed photoplethysmographic signals, biopotential/cardiac signals, etc., in the diagnosis, tracking, and treatment of cardiac-related pathologies and conditions, such assessment can be applied to the diagnosis, tracking, and treatment (including without limitation surgical, minimally invasive, lifestyle, nutritional, and/or pharmacologic treatment, etc.) of any pathologies or conditions in which a biophysical signal is involved in any relevant system of a living body. The assessment may be used in the controls of medical equipment or wearable devices or in monitoring applications (e.g., to report respiration rate or associated waveforms generated using the biophysical signals as disclosed therein).

The terms "subject" and "patient" as used herein are generally used interchangeably to refer to those who had undergone analysis performed by the exemplary systems and methods.

Example System

Figure 1A:
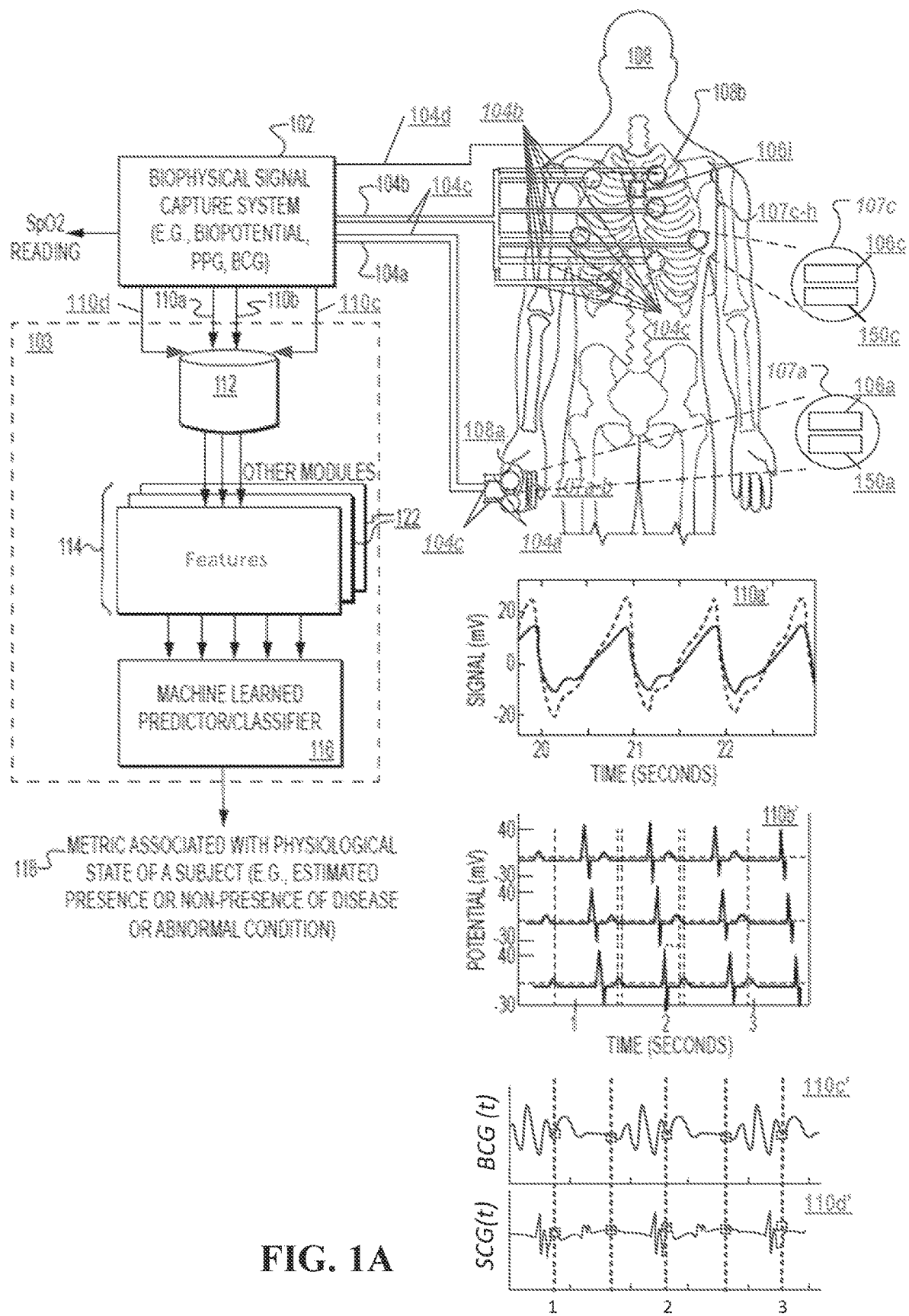
FIGS. 1A, 1B, and 1C each is a schematic diagram of example modules, or components, configured to non-invasively acquire biophysical signals, including ballistocardiographic signals, to compute ballistocardiographic features or parameters, among other features, to generate one or more metrics associated with the physiological state of a patient in accordance with an illustrative embodiment.
Figure 1B:
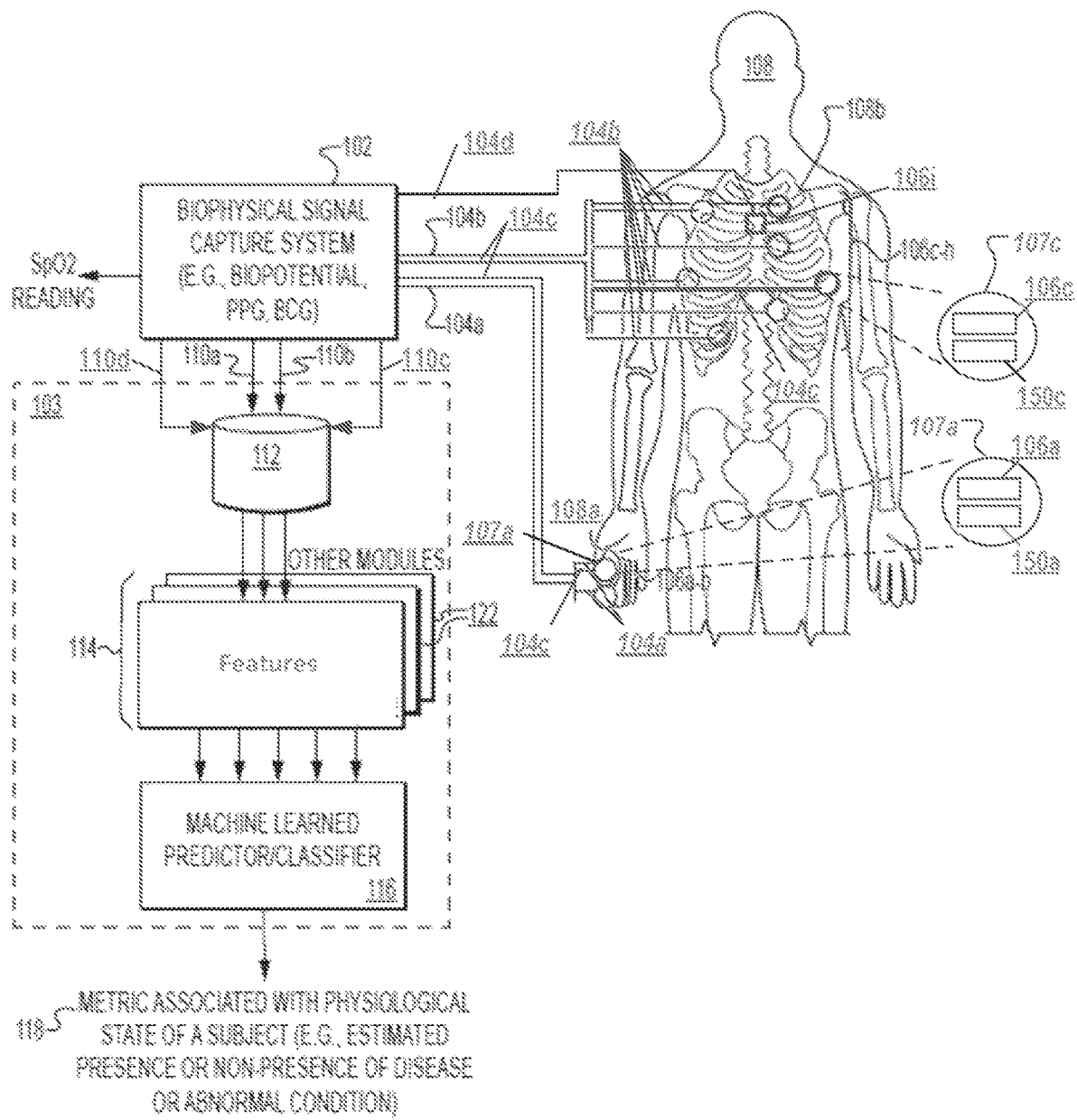
Figure 1C:
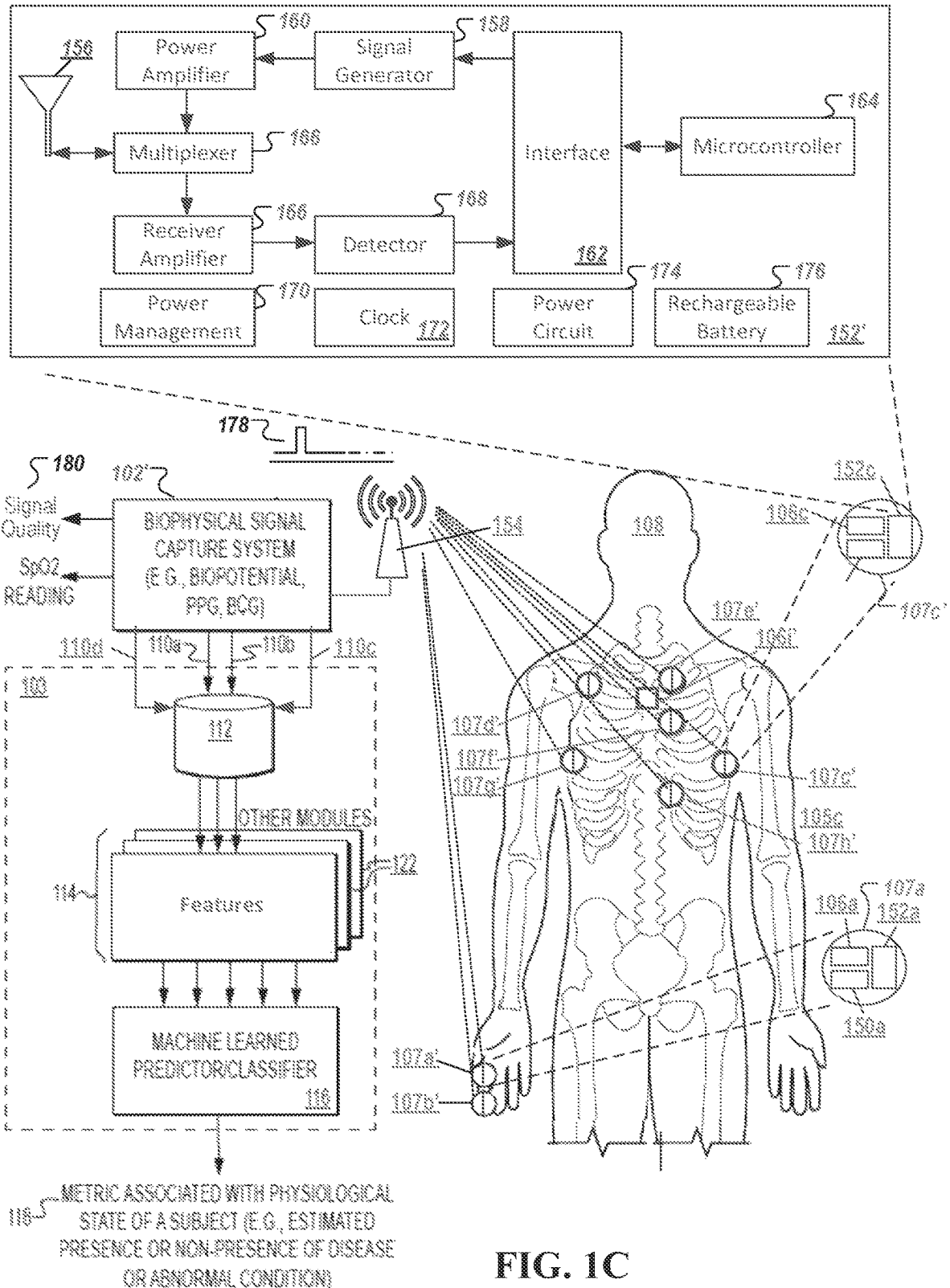

FIGS. 1A-1C each shows a schematic diagram of example modules, or components, configured to non-invasively acquire biophysical signals, including ballistographic signals, to compute ballistocardiographic features or parameters, among other features, to generate, via a classifier (e.g., machine-learned classifier), one or more metrics associated with the physiological state of a patient in accordance with an illustrative embodiment. The modules or components may be used in a production application or the development of the ballistocardiographic features and other classes of features. In FIG. 1A, multiple ballistocardiogram/seismocardiogram sensors are embedded and co-located to each channel of the cardiac signal acquisition sensors and each channel of the photoplethysmographic signal acquisition sensors. In FIG. 1B, a single ballistocardiogram/seismocardiogram sensor is embedded in one channel of the cardiac signal acquisition sensors and one channel of the photoplethysmographic signal acquisition sensors. In FIG. 1C, a wireless architecture is shown that can be implemented for the configuration of FIG. 1A or 1B, among others. Indeed, other topologies and configurations may be implemented.

The example analysis and classifiers described herein may be used to assist a healthcare provider in the diagnosis and/or treatment of cardiac- and cardiopulmonary-related pathologies and medical conditions, or an indicator of one. Examples include significant coronary artery disease (CAD), one or more forms of heart failure such as, e.g., heart failure with preserved ejection fraction (HFpEF), congestive heart failure, various forms of arrhythmia, valve failure, various forms of pulmonary hypertension, among various other disease and conditions disclosed herein.

In addition, there exist possible indicators of a disease or condition, such as an elevated or abnormal left ventricular end-diastolic pressure (LVEDP) value as it relates to some forms of heart failure, abnormal left ventricular ejection fraction (LVEF) values as they relate to some forms of heart failure or an elevated mean pulmonary arterial pressure (mPAP) value as it relates to pulmonary hypertension and/or pulmonary arterial hypertension. Indicators of the likelihood that such indicators are abnormal/elevated or normal, such as those provided by the example analysis and classifiers described herein, can help a healthcare provider assess or diagnose that the patient has or does not have a given disease or condition. In addition to these metrics associated with a disease state of condition, other measurements and factors may be employed by a healthcare professional in making a diagnosis, such as the results of a physical examination and/or other tests, the patient's medical history, current medications, etc. The determination of the presence or non-presence of a disease state or medical condition can include the indication (or a metric of measure that is used in the diagnosis) for such disease.

In FIG. 1A, the components include at least one non-invasive biophysical signal recorder or capture system 102 and an assessment system 103 that is located, for example, in a cloud or remote infrastructure or in a local system. Biophysical signal capture system 102 (also referred to as a biophysical signal recorder system), in this embodiment, is configured to, e.g., acquire, process, store and transmit synchronously acquired patient's electrical, hemodynamic signals, and ballistocardiographic signals as one or more types of biophysical signals 104. In the example of FIG. 1A, the biophysical signal capture system 102 is configured to synchronously capture, from co-located multi-sensors probes, three types of biophysical signals shown as first biophysical signals 104a (e.g., synchronously acquired to other first biophysical signals) comprising cardiac signals, second biophysical signals 104b (e.g., synchronously acquired to the other biophysical signals) comprising photoplethysmographic signals, and a third biophysical signals 104c and 104d (e.g., synchronously acquired to other biophysical signals) comprising ballistocardiographic signals. The biophysical signals (104a, 104b, 104c, 104d) can be acquired from measurement probes 106 and co-located measurement probes 150 to provide a measurement module 107 (e.g., shown as probe module 107a comprising hemodynamic sensors for hemodynamic signals 104a and accelerometer sensors for ballistocardiographic signals 104c; probe modules 107c-107h comprising leads for electrical/cardiac signals 104b and accelerometer sensors for ballistocardiographic signals 104c, and probes 106i comprising ballistocardiographic pressure sensors for ballistocardiographic signals 104d).

The probes 106a-i are placed on, e.g., by being adhered to or placed next to, a surface tissue of a patient 108 (shown at patient locations 108a located at the torso and back and 108b and the patient's limb, e.g., fingers). The patient is preferably a human patient, but it can be any mammalian patient. The acquired raw biophysical signals (e.g., 104a, 104b, 104c, and 104d) together form a biophysical-signal data set 110 (shown in FIG. 1A as a first biophysical-signal data set 110a, a second biophysical-signal data set 110b, a third biophysical-signal data set 110c, and a fourth biophysical-signal data set 110d, respectively) that may be stored, e.g., as a single file, preferably, that is identifiable by a recording/signal captured number and/or by a patient's name and medical record number.

In the FIG. 1A embodiment, the first biophysical-signal data set 110a comprises a set of raw photoplethysmographic, or hemodynamic, signal(s) associated with measured changes in light absorption of oxygenated and/or deoxygenated hemoglobin from the patient at location 108a. The second biophysical-signal data set 110b comprises a set of raw cardiac or biopotential signal(s) associated with electrical signals of the heart. The third biophysical-signal data set may include a ballistocardiographic data set 110c comprising a set of raw accelerometer signal(s) that are acquired at co-located positions of the (i) photoplethysmographic or hemodynamic signal(s). The third biophysical-signal data set may also include a second ballistocardiographic data set 110d comprising pressure or acoustic signal(s) associated with the heart and nearby structures, e.g., lungs, that are acquired on the torso In FIG. 1A, the third biophysical-signal data set type is shown being acquired via probe 150a and probes 150c-150h (see 150c in FIG. 1A) from subject 108 to generate a ballistocardiogram signal data set 110c from ballistocardiogram signals 104c temporally- and spatially-synchronized to the photoplethysmographic signal(s) 104a and cardiac signals 104b. While probes 150a and 150c are shown located in probe modules 107a and 107c, as noted above, probes 150a and 150c-150h are co-located in probe modules 107a and 107c-107h, respectively.

In addition, in FIG. 1A, the third biophysical-signal data set type is also shown being acquired via probes 106i from subject 108 to generate a ballistocardiogram signal data set 110d from ballistocardiogram signals 104d temporally- and spatially-synchronized to the photoplethysmographic signal(s) 104a, cardiac signals 104b, and ballistocardiogram signals 104c. In some embodiments, the probe 150a, probes 150c-150h, and probe 106i may include a set of multi-axis accelerometers or a set of acoustic, vibration, or pressure sensors. The probes (e.g., 150a, 150c-150h) may be respectively embedded or enclosed within each electrode snap of a lead-set of the other probes (e.g., 106a-106b and 106c-106h) to be co-located with them. In some embodiments, the ballistocardiogram signal data set 110c and/or 110d includes a measure that reflects the flow of blood through the entire body, e.g., as detected via a multi-axis accelerometer, acoustic sensor, pressure sensor, or other BCG-based sensors described herein. In some embodiments, the ballistocardiogram signal data set 110c and/or 110d include a measurement acquired from seismocardiogram (SCG) sensors to measure vibrations. In some embodiments, the ballistocardiogram signal data set 110c and/or 110d include ballistocardiogram signals as described in Etemadi et al., "Wearable ballistocardiogram and seismocardiogram systems for health and performance," J Appl Physiol 124: 452-461, 2018. In other embodiments, the ballistocardiogram signal data set 110c and/or 110d include ballistocardiogram signals as described in Wiens et al., "Wearable Ballistocardiography: Preliminary Methods for Mapping Surface Vibration Measurements to Whole Body Forces," Conf Proc IEEE Eng Med Biol Soc. 2014; 2014: 5172-5175.

Though in FIG. 1A, raw photoplethysmographic/hemodynamic and co-located accelerometer signal(s) are shown being acquired at a patient's finger, the signals may be alternatively acquired at the patient's toe, wrist, forehead, earlobe, neck, etc. In addition, although the cardiac or biopotential signal and s) are shown to be acquired via three sets of orthogonal leads, other lead configurations may be used (e.g., 11 lead configuration, 12 lead configuration, etc.).

Plots 110a', 110b', 110c' show examples of the first biophysical-signal data set 110a, the second biophysical-signal data set 110b, and the third biophysical-signal data set 110c, 110d, respectively. Specifically, Plot 110a' shows an example of an acquired photoplethysmographic or hemodynamic signal. In Plot 110a', the photoplethysmographic signal is a time series signal having a signal voltage potential as a function of time as acquired from two light sources (e.g., infrared and red-light source). Plot 110b' shows an example cardiac signal comprising a 3-channel potential time series plot. In some embodiments, the biophysical signal capture system 102 preferably acquires biophysical signals via non-invasive means or component(s). In Plot 110c', the ballistocardiographic signal is a time series signal having a signal voltage potential as a function of time as acquired from accelerometers. In Plot 110d', the ballistocardiographic signal is a time series signal having a signal voltage potential as a function of time as acquired from an acoustic or pressure sensor. In alternative embodiments, invasive or minimally-invasively means or component(s) may be used to supplement or as substitutes for the non-invasive means (e.g., implanted pressure sensors, chemical sensors, accelerometers, and the like). In still further alternative embodiments, non-invasive and non-contact probes or sensors capable of collecting biophysical signals may be used to supplement or as substitutes for the non-invasive and/or invasive/minimally invasive means, in any combination (e.g., passive thermometers, scanners, cameras, x-ray, magnetic, or other means of non-contact or contact energy data collection system as discussed herein).

Ballistocardiogram signals measure flow of blood through a body section. FIG. 1C shows an example of a ballistocardiogram signal(s) 110c' and 10d (also referred to herein as a BCG signal or SCG signal) acquired via measurement system 102 in accordance with an illustrative embodiment. Specifically, FIG. 1C shows an acoustic waveform for a ballistocardiogram signal (plot 110c') and a vibration waveform for a seismocardiogram (plot 110d'). As discussed, in some embodiments, the ballistocardiogram signal(s) 104c are alternatively acquired from a set of multi-axis accelerometers embedded or enclosed within each electrode snap of a lead-set of the other probes (e.g., 104*a*-104*b*, 104*c*-104*h*). An example of multi-axis accelerometers that may be integrated into the probe set is the Small, Low Power, 3-Axis ±3 g Accelerometer, model no. ADXL335 (manufactured by Analog Devices). Additional examples of multi-axis accelerometers are discussed in David Da He, "A Wearable Heart Monitor at the Ear using Ballistocardiogram (BCG) and Electrocardiogram (ECG) with a Nanowatt ECG Heartbeat Detection Circuit," Ph.D. thesis, Massachusetts Institute of Technology, which is incorporated by reference herein in its entirety.

Referring to FIG. 1A, biophysical signal capture system 102 is configured with circuitries and computing hardware, software, firmware, middleware, etc., in some embodiments, to acquire, store, transmit, and optionally process both the captured biophysical signals to generate the biophysical-signal data set 110. An example biophysical signal capture system 102 and the acquired biophysical-signal set data 110 are described in U.S. Pat. No. 10,542,898, entitled "Method and Apparatus for Wide-Band Phase Gradient Signal Acquisition," or U.S. Patent Publication No. 2018/0249960, entitled "Method and Apparatus for Wide-Band Phase Gradient Signal Acquisition," each of which is hereby incorporated by reference herein in its entirety.

In some embodiments, biophysical signal capture system 102 includes two or more signal acquisition components, including a first signal acquisition component (not shown) to acquire the first biophysical signals (e.g., photoplethysmographic signals) and includes a second signal acquisition component (not shown) to acquire the second biophysical signals (e.g., cardiac signals). In some embodiments, the electrical signals are acquired at a multi-kilohertz rate for a few minutes, e.g., between 1 kHz and 10 kHz. In other embodiments, the electrical signals are acquired between 10 kHz and 100 kHz. The hemodynamic signals may be acquired, e.g., between 100 Hz and 1 kHz.

Biophysical signal capture system 102 may include one or more other signal acquisition components (e.g., sensors such as mechano-acoustic, ballistographic, ballistocardiographic, etc.) for acquiring signals. In other embodiments of the signal capture system 102, a signal acquisition component comprises conventional electrocardiogram (ECG/EKG) equipment (e.g., Holter device, 12 lead ECG, etc.).

Assessment system 103 comprises, in some embodiments, the data repository 112 and an analytical engine or analyzer (not shown—see FIGS. 15A and 15B). Assessment system 103 may include feature modules 114 and a classifier module 116 (e.g., an ML classifier module). In FIG. 1, Assessment system 103 is configured to retrieve the acquired biophysical signal data set 110, e.g., from the data repository 112, and use it in the feature modules 114, which is shown in FIG. 1 to include a respiration feature module 120 and other modules 122 (later described herein). The features modules 114 compute values of features or parameters, including those of respiration rate-related features to provide to the classifier module 116, which computes an output 118, e.g., an output score, of the metrics associated with the physiological state of a patient (e.g., an indication of the presence or non-presence of a disease state, medical condition, or an indication of either). Output 118 is subsequently presented, in some embodiments, at a healthcare physician portal (not shown—see FIGS. 15A and 15B) to be used by healthcare professionals for the diagnosis and treatment of pathology or a medical condition. In some embodiments, a portal may be configured (e.g., tailored) for access by, e.g., patient, caregivers, researchers, etc., with output 118 configured for the portal's intended audience.

Other data and information may also be a part of output 118 (e.g., the acquired biophysical signals or other patient's information and medical history).

Classifier module 116 (e.g., ML classifier module) may include transfer functions, loop up tables, models, or operators developed based on algorithms such as but not limited to decision trees, random forests, neural networks, linear models, Gaussian processes, nearest neighbor, SVMs, Naïve Bayes, etc. In some embodiments, classifier module 116 may include models that are developed based on ML techniques described in concurrently filed U.S. provisional patent application entitled "Method and System to Non-Invasively Assess Elevated Left Ventricular End-Diastolic Pressure"; U.S. Patent Publication No. 20190026430, entitled "Discovering Novel Features to Use in Machine Learning Techniques, such as Machine Learning Techniques for Diagnosing Medical Conditions"; or U.S. Patent Publication No. 20190026431, entitled "Discovering Genomes to Use in Machine Learning Techniques," each of which is hereby incorporated by reference herein in its entirety.

Subsequent to signal acquisitions and recording, the biophysical signal capture system 102 then provides, e.g., sending over a wireless or wired communication system and/or a network, the acquired biophysical-signal data set 110 (or a data set derived or processed therefrom, e.g., filtered or pre-processed data) to a data repository 112 (e.g., a cloud-based storage area network) of the assessment system 103. In some embodiments, the acquired biophysical-signal data set 110 is sent directly to the assessment system 103 for analysis or is uploaded to a data repository 112 through a secure clinician's portal.

Figure 6:
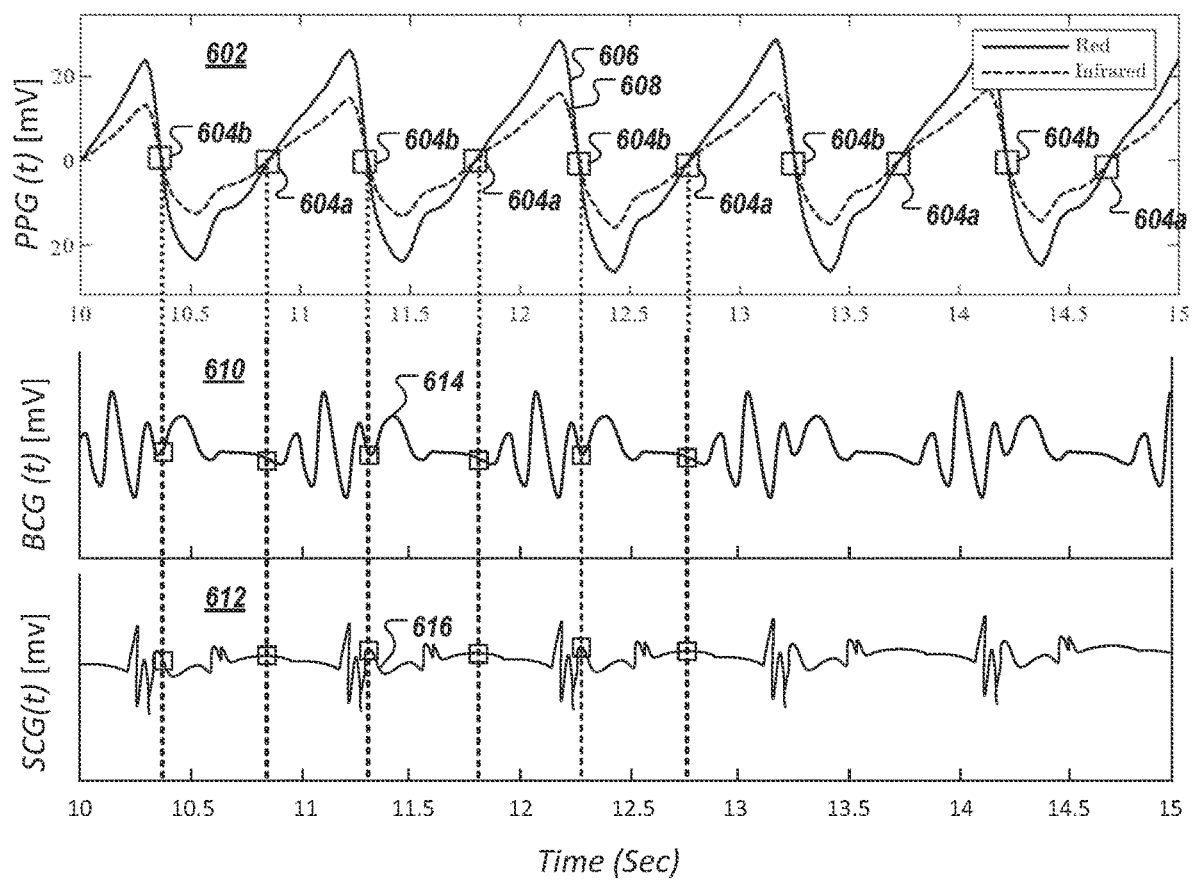
FIG. 6 illustrates a set of example synchronicity features or parameters between a biophysical signal and an acquired ballistocardiographic signals in accordance with an illustrative embodiment.

As noted above, FIGS. 1B and 1C each shows a schematic diagram of example modules, or components, configured to non-invasively acquire biophysical signals (e.g., including ballistographic signals) to compute ballistocardiographic features or parameters and/or other features to generate, via a classifier (e.g., machine-learned classifier), one or more metrics associated with the physiological state of a patient in accordance with an illustrative embodiment. In FIG. 1B, a single ballistocardiogram/seismocardiogram sensor (150*c*, 150*a*) is embedded to one channel of the cardiac signal acquisition sensors (106*c*) and one channel of the photoplethysmographic signal acquisition sensors (106*a*), respectively. In the example of FIG. 1B, 6 cardiac signal acquisition sensors are also shown (106*c*-106*h*) of which one (106*c*) is configured co-located with sensor 150*c* (see 107*c*). Similarly, in FIG. 1B, 2 photoplethysmographic signal acquisition sensors are also shown (106*a*, 106*c*) co-located with ballistocardiographic sensors 150*a* (see 107*a*).

In FIG. 1C, a wireless architecture is shown that can be implemented for the configuration of FIG. 1A or 1B. In the example, the ballistocardiogram/seismocardiogram sensors (106*i'*), cardiac sensor modules 107*c'*-107*h'* comprising cardiac signal acquisition sensors (106*c-h*) and/or accelerometers 150*c*-150*h*, and ballistocardiographic sensor modules 107*a'* comprising photoplethysmographic signal acquisition sensors (106*a-b*) and/or accelerometer 150*a* are configured as independent sensors that each includes a network interface 152 to provide time-synchronized measured data sets to the measurement system 102 (shown as 102'). The network interface 152 may be configured to operate using ultra-wide band communication hardware.

In alternative embodiments, the ballistocardiogram/seismocardiogram sensors (106*i'*), cardiac sensor modules 107*c'*-107*h'*, and ballistocardiographic sensor modules 107*a'* can be coupled, via cables, to a single transmitter device that can be placed at the patient's arm or waist, e.g., as a hybrid of FIGS. 1A and 1C. That transmitter then communicates with the measurement system 102'.

In some embodiments, the ultra-wide band communication hardware can be configured for short-range wireless communication with low-latency and high-resolution synchronization. The ultra-wide band communication hardware may include an ultra-low power, low latency UWB wireless transceiver circuit that can, for example, operate between about 3 GHz and about 6 GHz or between about 6 GHz and about 9.3 GHz with, e.g., a 10 dBm peak transmit power output.

UWB employs a short duration impulse signal architecture, using orthogonal frequency division multiplexing (OFDM) and frequency shift keying (FSK) operations, that has a very high bandwidth to transmit a short signal burst over a very wide radio spectrum. The UWB transmitter and receiver can thus operate for a very short period of time and then turn off to lower power consumption during the off-cycle. The short duration impulse signal operation can be configured for improved link latency (e.g., having a latency of 50 μs for 1000 bits). UWB can provide sufficient bandwidth for the acquisition sampling rate of the cardiac signals and photoplethysmographic signals described herein, e.g., supporting data rate of up to about 10 Mbps at power use of 1 nJ/bit. An example UWB transceiver is the SR1000 series UWB devices (manufactured by SPARK Microsystems, Canada).

In the example of FIG. 1C, six cardiac signal acquisition probes (106c-160h) are co-located with six BCG signal acquisition probes (150c-150h) in the measurement modules (107c'-107h'), and two photoplethysmographic/BCG signal acquisition probes (106a,b) are co-located with a BCG signal acquisition probe (150a) in a measurement module (107a'). The measurement modules (107a', 107c'-107h') are each configured with the wireless transceiver module 152 (e.g., 152a, 152c-152h, though only 152a and 152c are shown), e.g., UWB wireless transceiver, to provide the recorded signals 104a-h (now referenced in this example as 104a'-104h') to the measurement system 102' comprising a transceiver module 154.

In the example shown in FIG. 1C, the wireless transceiver module 152 (shown as 152') includes an antenna 156 that couples to a transmitter circuit comprising signal generator 158, power amplifier 160, and associated digital control and interface (shown as interface 162 and microcontroller 164). The wireless transceiver module 152' includes a multiplexor to select the antenna between transmitting and receiving operation. The wireless transceiver module 152' includes a receiver circuit comprising a receiver amplifier 166, detector 168, and the same digital control and interface (162, 164). The wireless transceiver module 152' can also include other circuitries, including power management circuit 170, clock 172, power circuit 174, and energy storage 176 (shown as "Rechargeable Battery" 176).

To ensure synchronization among the measurement modules (107a', 107c'-107h'), and thus synchronization of the acquired photoplethysmographic signals 104a, cardiac signals 104b, and ballistocardiographic signals 104c, 104d, a passive synchronization approach or an active synchronization operation may be employed.

The passive synchronization approach can entail the physician invoking a stimulus to all the measurement modules (107a', 107c'-107h') at the beginning of the signal recording that resembles an impulse, e.g., by providing a physical tap to the patient. The physical stimulus provides a landmark in the recorded signals that can be used to align the different signals (e.g., 104a, 104b, 104c, 104d).

The measurement system 102' and the measurement modules (107a', 107c'-107h') may be configured for active synchronization operation. The measurement modules (107a', 107c'-107h') can receive a synchronization pulse or waveform (178) transmitted through the transceiver module 154 from the measurement system 102'. In some embodiments, the synchronization (active or passive) is within about 1 ms of jitter. In some embodiments, the synchronization can provide up to 1 μs of jitter.

The measurement system 102' can estimate the signal quality of the transmitted signal from the measurement probes 107a', 107c'-107h'. The estimated signal quality is stored as a time series signal along with the recorded signal and used to exclude portions of the recorded signal from the analysis when signal quality is below a pre-defined threshold. With portions of the signals being excluded, the boundaries of the signal are subject to high-frequency noise. The excluded portions may be based on cardiac cycles to minimize such noise. The measurement system 102' can output (180) the estimated signal quality to a signal quality monitor, e.g., comprising a graphical user interface.

The wireless operation can beneficially reduce the technical issues associated with having cables to various portions of the body. Larger pads can be employed to improve the retention of the measurement probes at the surface of the skin.

Example Biophysical Signal Acquisition

Figure 2:
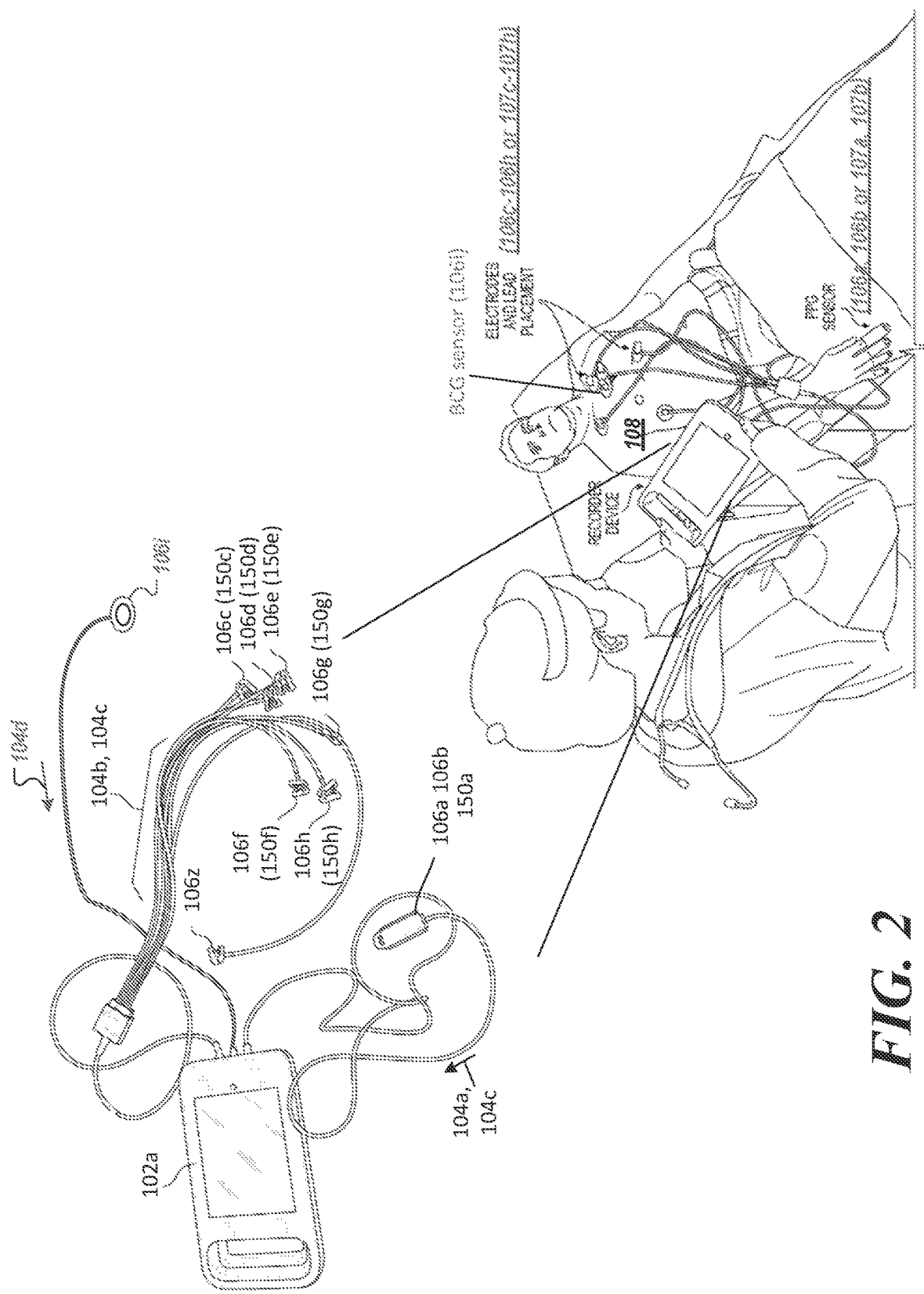
FIG. 2 shows an example biophysical signal capture system or component and its use in non-invasively collecting biophysical signals of a patient in a clinical setting in accordance with an illustrative embodiment.

FIG. 2 shows a biophysical signal capture system 102 (shown as 102a) and its use in non-invasively collecting biophysical signals of a patient in a clinical setting in accordance with an illustrative embodiment. In FIG. 2, the biophysical signal capture system 102a is configured to capture three types of biophysical signals from the patient 108 while the patient is at rest. The biophysical signal capture system 102a synchronously acquires the patient's (i) electrical signals (e.g., cardiac signals corresponding to the second biophysical-signal data set 110b) from the torso using orthogonally placed sensors (106c-106h; 106z is a $7^{th}$ common-mode reference lead), (ii) hemodynamic signals (e.g., PPG signals corresponding to the first biophysical-signal data set 110a) from the finger using a photoplethysmographic sensor (e.g., collecting signals 106a, 106b), and (iii) ballistocardiographic signals 106c, 106d (e.g., from the accelerometer, pressure, acoustic sensors, or other described herein).

As shown in FIG. 2, the electrical, hemodynamic, ballistocardiographic signals (e.g., 104a, 104b, 104d) are collected via commercially available sensors applied to the patient's skin. The signals may be acquired beneficially without patient exposure to ionizing radiation or radiological contrast agents and without patient exercise or the use of pharmacologic stressors. The biophysical signal capture system 102a can be used in any setting conducive for a healthcare professional, such as a technician or nurse, to acquire the requisite data and where a cellular signal or Wi-Fi connection can be established.

The electrical signals (e.g., corresponding to the second biophysical signal data set 110b) are collected using three orthogonally paired surface electrodes arranged across the patient's chest and back along with a reference lead. The electrical signals are acquired, in some embodiments, using a low-pass anti-aliasing filter (e.g., ~2 kHz) at a multi-kilohertz rate (e.g., 8 thousand samples per second for each of the six channels) for a few minutes (e.g., 215 seconds). In alternative embodiments, the biophysical signals may be continuously/intermittently acquired for monitoring, and portions of the acquired signals are used for analysis. The hemodynamic signals (e.g., corresponding to the first biophysical signal data set 110*a*) are collected using a photoplethysmographic sensor placed on a finger. The photo-absorption of red light (e.g., any wavelengths between 600 nm and 750 nm) and infrared light (e.g., any wavelengths between 850 nm and 950 nm) are recorded, in some embodiments, at a rate of 500 samples per second over the same period. The biophysical signal capture system 102*a* may include a common mode drive that reduces common-mode environmental noise in the signal. Ballistocardiographic signals comprising acoustic waveforms or vibration waveforms may be collected using piezoelectric electrodes or sensors placed on the patient's chest. Ballistocardiographic signals comprising multi-axis accelerometer waveforms may be acquired from accelerometers embedded or enclosed within each electrode snap of the cardiac and photoplethysmographic sensors.

The photoplethysmographic, cardiac, and ballistocardiographic signals can be simultaneously acquired for each patient. Jitter (inter-modality jitter) in the data may be less than about 10 microseconds (µs). Jitter among the cardiac signal channels may be less than 10 microseconds, e.g., around ten femtoseconds (fs).

A signal data package containing the patient metadata and signal data may be compiled at the completion of the signal acquisition procedure. This data package may be encrypted before the biophysical signal capture system 102*a* transferring to the data repository 112. In some embodiments, the data package is transferred to the assessment system (e.g., 103). The transfer is initiated, in some embodiments, following the completion of the signal acquisition procedure without any user intervention. The data repository 112 is hosted, in some embodiments, on a cloud storage service that can provide secure, redundant, cloud-based storage for the patient's data packages, e.g., Amazon Simple Storage Service (i.e., "Amazon S3"). The biophysical signal capture system 102*a* also provides an interface for the practitioner to receive notification of an improper signal acquisition to alert the practitioner to immediately acquire additional data from the patient.

Example Probe

Figure 3A:
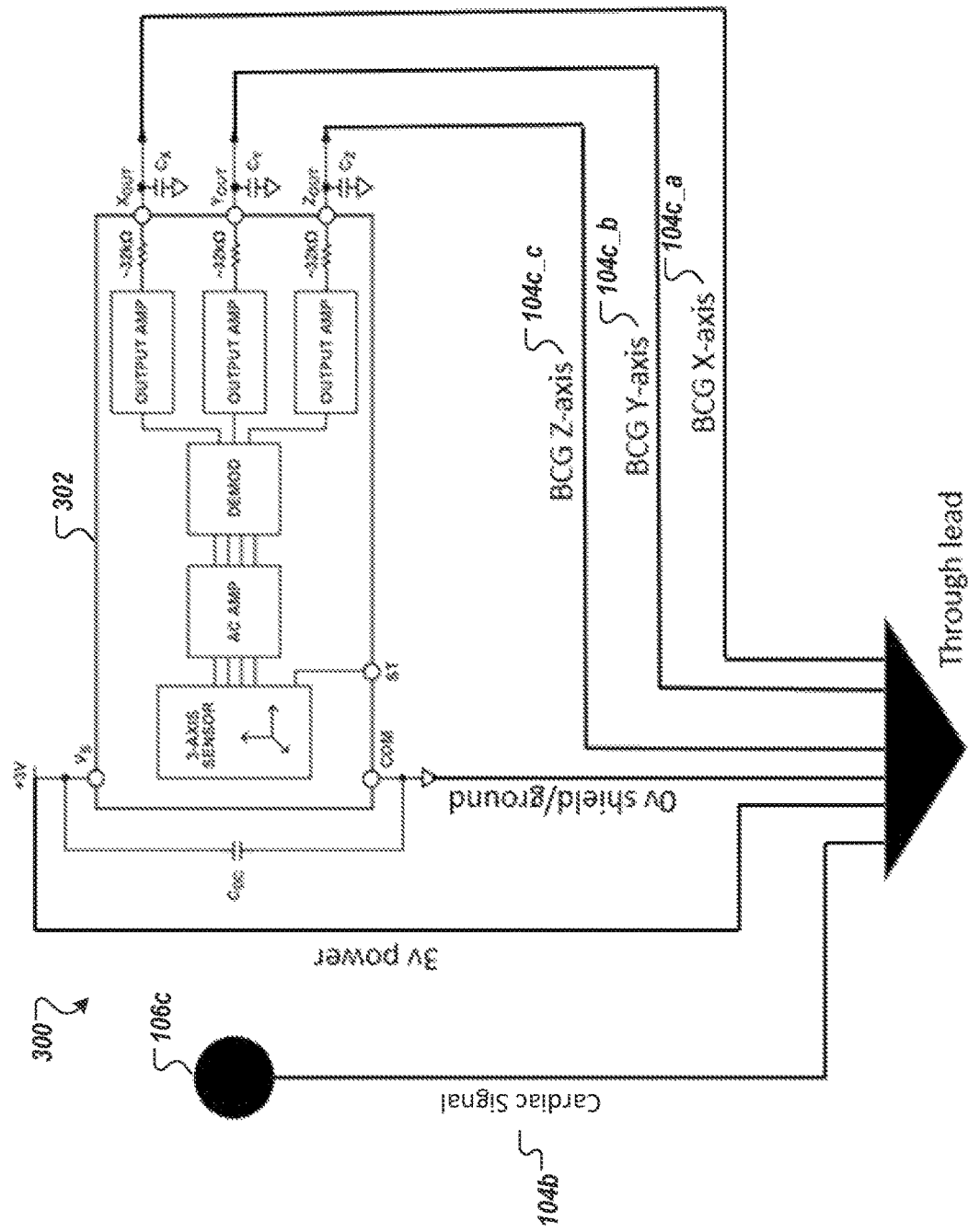
FIGS. 3A and 3B each shows an example lead-set comprising cardiac or photoplethysmographic probes that are integrated with ballistocardiographic sensors such as accelerometer sensors.
Figure 3B:
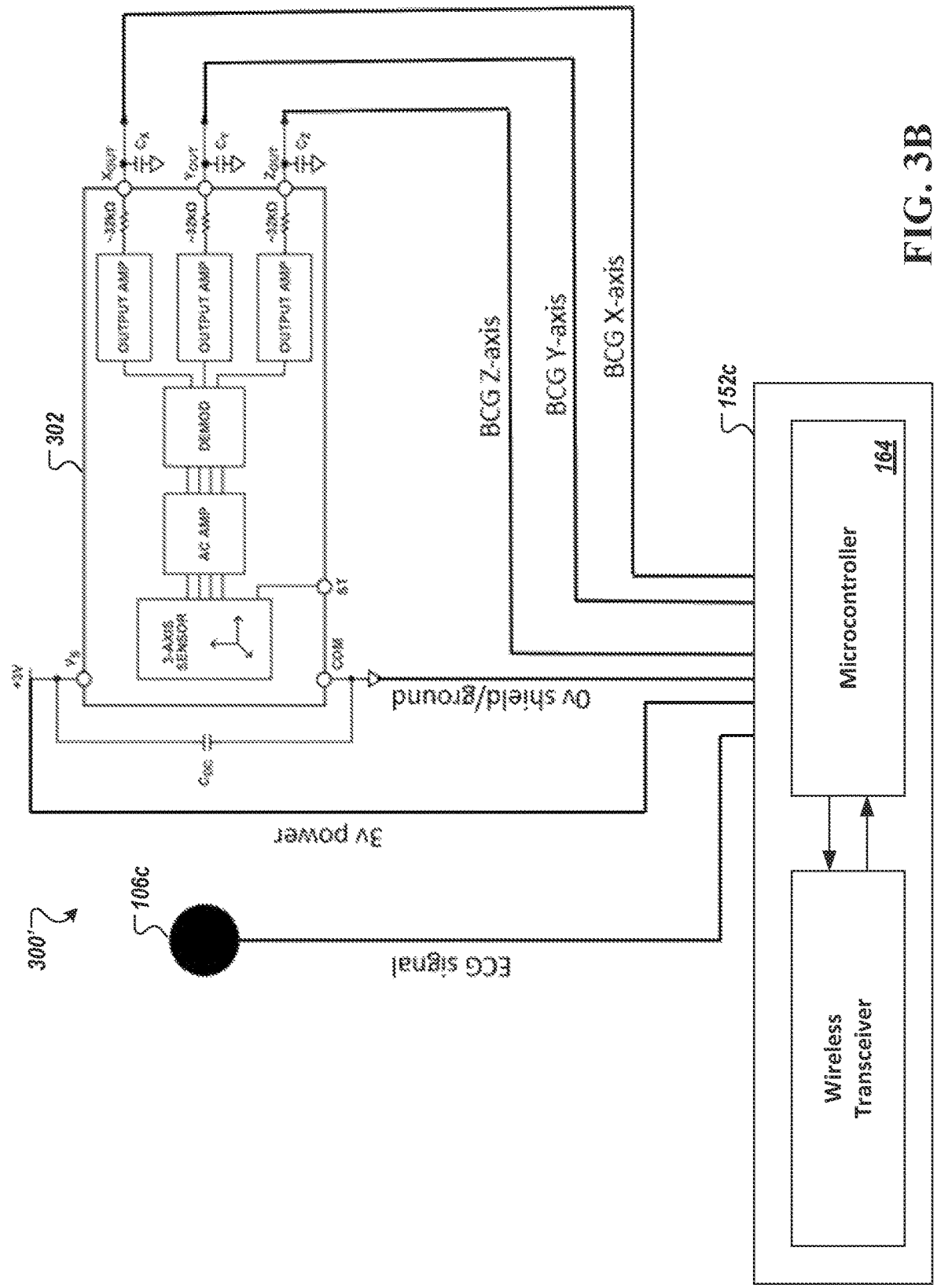

FIGS. 3A and 3B each shows an example lead-set (e.g., for measurement probes 107*c*-107*h*) comprising cardiac probes (e.g., 106*c*-*h*) that are integrated with ballistocardiographic sensors such as accelerometer sensors (e.g., 150*a*, 150*c*-105*h*). Similar hardware topology can be employed for PPG probes (106*a*-*b*). Because of the proximity of the two ballistocardiographic sensors to one another, the sensors may be integrated into a single measurement probe comprising a single accelerometer sensor.

In the example shown in FIG. 3A, the example lead-set 300 includes a 3-axis accelerometer 302 and a surface electrode (e.g., one of 106*c*-106*h*) (shown as 106*c*). An example 3-axis accelerometer sensor may be the ADXL335, which is a small 4 mm×4 mm×1.45 mm package IC that can be integrated into a lead snap. In this embodiment, the ground is the shield, held at 0v. The 3-axis accelerometer sensor can provide ballistocardiographic signals 104*c* (shown as 140*c*_a, 104*c*_b, and 104*c*_c) while the cardiac probe 106 can provide a cardiac signal 104*b*. The cardiac probe (e.g., any one of 106*c*-106*h*) and BCG probe 150 (150*c*-150*h*) can connect through a lead to a cable that connects to measurement system 102. A similar configuration of the 3-axis accelerometer may be applied to a photoplethysmogram sensor.

FIG. 3B shows the example lead-set 300 (shown as 300') of FIG. 3A configured as a wireless measurement module 107 comprising a wireless transceiver module 152 (shown as 152*c*). The wireless transceiver module 152*c* includes the microcontroller 164 and wireless transceiver circuit, e.g., 156-162 and 166-176, described in relation to FIG. 1C.

Example Method of Operation

Figure 4:
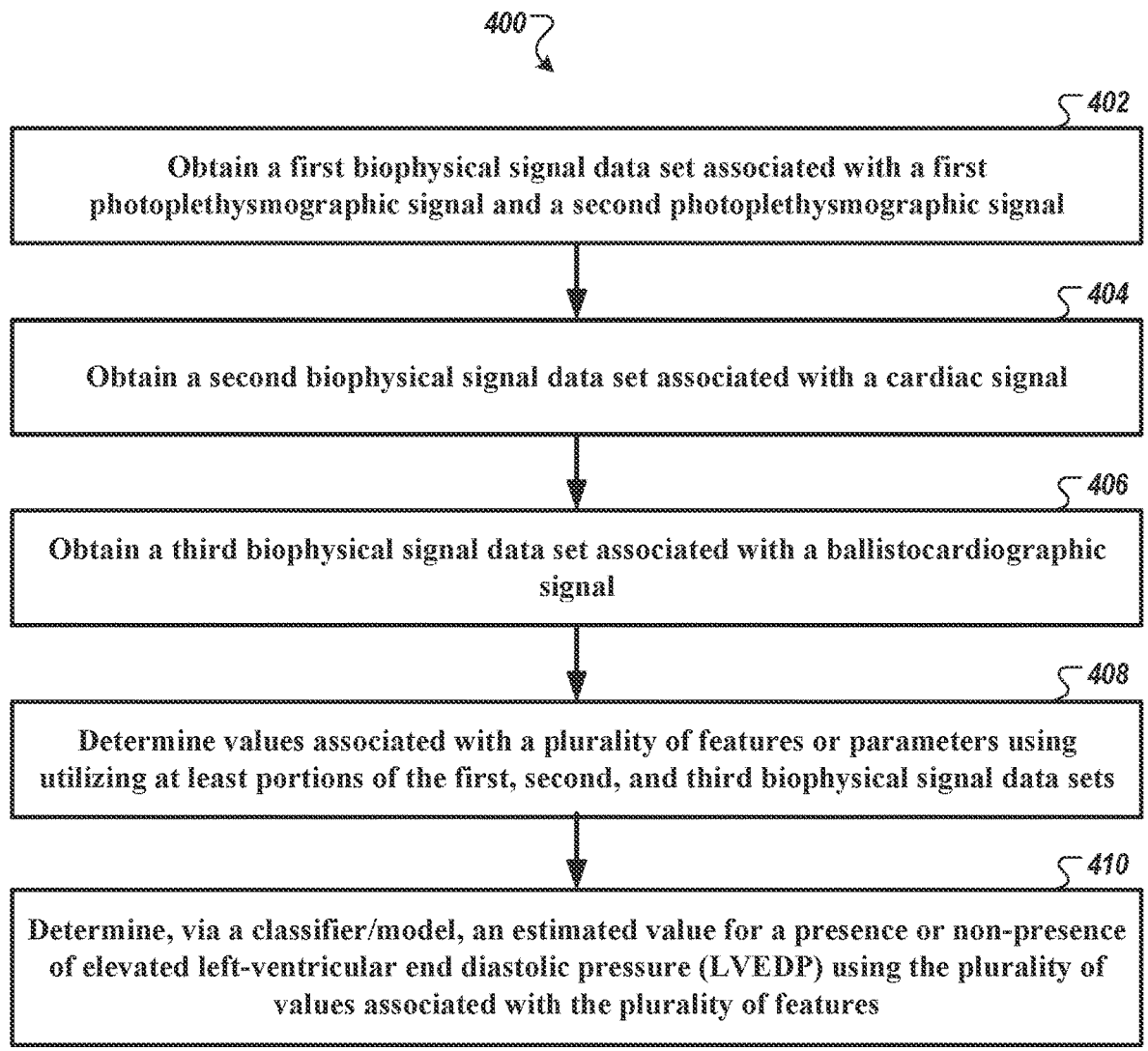
FIG. 4 shows an example method to use BCG features or their intermediate outputs in a practical application for diagnostics, treatment, monitoring, or tracking in accordance with an illustrative embodiment.

FIG. 4 shows an example method to use BCG features or their intermediate outputs in a practical application for diagnostics, treatment, monitoring, or tracking.

Estimation of Presence of Disease State or Indicating Condition. FIG. 4 shows a method 400 that employs BCG-related and other parameters or features to determine estimators of the presence of a disease state, medical condition, or indication of either, e.g., to aid in the diagnosis, tracking, or treatment. Method 300 includes the step of acquiring (402, 404, 406) biophysical signals from a patient (e.g., cardiac signals, photoplethysmographic signals, ballistocardiographic signals), e.g., as described in relation to FIGS. 1 and 2 and other examples as described herein. In some embodiments, the acquired biophysical signals are transmitted for remote storage and analysis. In other embodiments, the acquired biophysical signals are stored and analyzed locally.

As stated above, one example in the cardiac context is the estimation of the presence of abnormal left-ventricular end-diastolic pressure (LVEDP) or mean pulmonary artery pressure (mPAP), significant coronary artery disease (CAD), abnormal left ventricular ejection fraction (LVEF), and one or more forms of pulmonary hypertension (PH), such as pulmonary arterial hypertension (PAH). Other pathologies or indicating conditions that may be estimated include, e.g., one or more forms of heart failure such as, e.g., heart failure with preserved ejection fraction (HFpEF), arrhythmia, congestive heart failure, valve failure, among various other disease and medical conditions disclosed herein.

Method 400 further includes the step of retrieving the data set and determining (408) values of BCG-related features, among other features. Example operations to determine the values of synchronicity-related features are provided in relation to FIGS. 5-9 later discussed herein. Method 400 further includes the step of determining (410) an estimated value for a presence of a disease state, medical condition, or an indication of either based on an application of the determined respiration rate-related features to an estimation model (e.g., ML models).

Method 400 further includes the step of outputting estimated value(s) for the presence of disease state or abnormal condition in a report (e.g., to be used diagnosis or treatment of the disease state, medical condition, or indication of either), e.g., as described in relation to FIG. 1 and other examples described herein.

Example BCG Feature Sets

Figure 5:
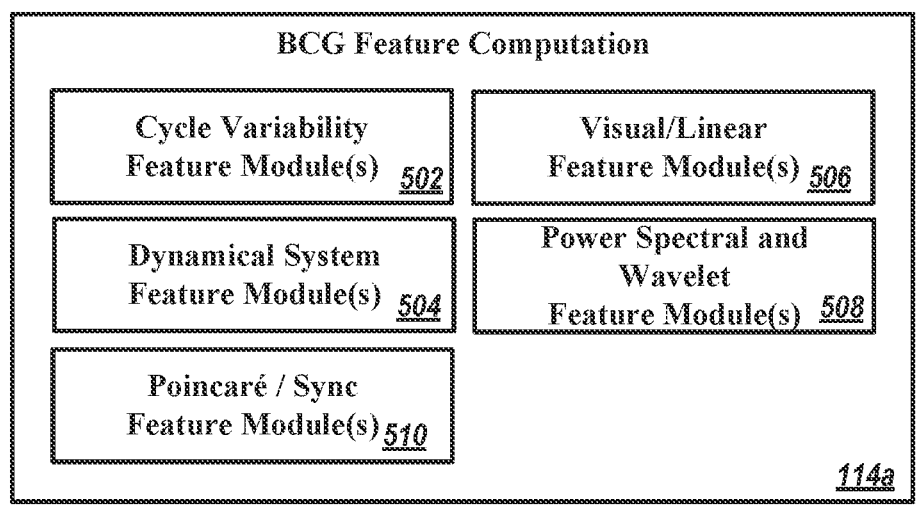
FIG. 5 shows an example of feature module(s) which can employ ballistographic signals and/or other biophysical signals that can be used in a trained classifier to estimate for the assessment of a disease state, abnormal condition, or an indication of either, in accordance with an illustrative embodiment.

FIG. 5 shows an example of feature module(s) 114 (shown as 114*a*), which can employ ballistographic signals and/or other biophysical signals that can be used in a trained classifier to estimate for the assessment of a disease state, abnormal condition, or indication of either. The number of features and feature classes may be adjusted while still being able to provide an estimation.

Cycle Variability features (Module(s) 502). This first class of features can quantify the beat-to-beat variations in biopotential by comparing each beat to a template beat. The template beat is the most prominent waveform represented across the entire signal acquired by applying the median filter to the stacked beat-to-beat segmented signal through VD peak matching.

An example feature (e.g., CVscore_X) calculates the distance between the signal and the template beat at the baseline (the section of the signal with no electrical activity) at channel X of a cardiac signal as a score value.

Table 1A provides a list of the BCG cycle-variability features that are used in the assessment of disease, condition, or indicator of either, that can be implemented in Module(s) 114*a*.

TABLE 1A

| Feature Name | Feature Name |
|---|---|
| CVscore_BCG. | CV_BCG_Skew |
| CV_BCG_std | CV_BCG_mean |

To generate BCG-based features, module 114*a* may determine a template-signal vector data set representing the quasi-periodic signal pattern of the subject from a plurality of detected quasiperiodic cycles detected in the BCG-signal data set. In some embodiments, the template-signal vector data set is determined as a median of a peak-peak interval signal extracted from peaks identified in the acoustic or pressure signal of the ballistocardiograph signal (e.g., 104*d*). That is, the module first identifies peaks within the ballistocardiograph signal. The module then extracts windowed portions of the signal between the peaks and adjusts the extracted portions for a pre-defined length to which the normalized length windows can be condensed using a median or mean operator. In some embodiments, module 114*a* can identify cycles within another biophysical signal, such as cardiac signal. Module 114*a* can then extract BCG windows based on the determined cardiac cycles.

The module 114*a* may then calculate the difference between the determined template-signal vector data and the source BCG-signal data. The CV score can be determined as the median of the calculated residue (e.g., CVscore_BCG).

In some embodiments, a distribution of cycle-variability for the acquired BCG signals can be calculated, and a statistical assessment, e.g., mean, median, standard deviation, skewness, and kurtosis of an assessed distribution can be calculated as the BCG cycle variability features, e.g., as shown in Table 1A (CV_BCG_std, CV_BCG_mean, CV_BCG_Skew). Additional description of these features in the context of other biophysical signals, which can be similarly implemented for BCG signals, may be found in a provisional U.S. application No. 63/130,324, titled "Method and System to Assess Disease Using Cycle Variability Analysis of Biophysical Signals," which is incorporated by reference herein in its entirety.

Dynamical Systems (DS) features (Module(s) 504). This second class of features can quantify the dynamical characteristics of the biophysical signals, such as ballistocardiographic signals (e.g., acoustics or pressure), cardiac/biopotential channels, and PPG signals. Examples of the dynamical characteristics include Lyapunov exponent, correlation dimension, entropy, mutual information, correlation, and outputs of nonlinear filtering. An example BCG dynamical feature calculates the Lyapunov exponent of acoustics, pressure, or accelerometer.

Table 1B provides an example list of dynamical system features that are used in the assessment of disease, abnormal condition, or indications of either, that can be implemented in Module(s) 334.

TABLE 1B

| Feature Name |
|---|
| LE_BCG |
| D2_BCG |

Lyapunov exponent ("LE_BCG") is the rate of exponential growth of the small initial perturbations of an acoustics, pressure, or accelerometer signal and can be calculated as a representation of fast two nearby trajectories diverging:

$$\lambda = \lim_{t \to \infty} \frac{1}{t} \ln\left(\left|\frac{\delta(t)}{\delta_0}\right|\right) \qquad \text{(Equation 1)}$$

where $\lambda$ is the LE and $\delta(t)$ is the evolution of the initial perturbation $\delta_0$. In some embodiment, $\lambda$ is calculated as the average over many points and for a finite time.

Fractal dimension ("D2_BCG") of acoustics, pressure, or accelerometer signal can be obtained as:

$$D_2 = \lim_{\epsilon \to 0} \frac{1}{q-1} \frac{\ln C_q(\epsilon)}{\ln(\epsilon)} \qquad \text{(Equation 2)}$$

where $C_q(\epsilon) = \int_s e(s) [\int_s \Theta(\epsilon - |s-s'|) \, d\mu(s')]^{q-1}$, where the function $\Theta$ is the Heviside function that acts on two points of the trajectory s and s' and $\mu(s)$ is the probability density function.

An alpha shape or convex hull can be generated to encapsulate a phase space data set of either (i) three ballistocardiographic channels or (ii) a ballistocardiographic signal and its first- and second-order derivative. Geometric parameters such as void, volume, perimeters may be extracted as features of the alpha shape or convex hull.

Additional description of these features, e.g., for correlation dimension, entropy, mutual information, correlation, and outputs of nonlinear filtering, in the context of other biophysical signals, which can be similarly implemented for BCG signals, may be found in U.S. Published Application no. US2020/0397322, entitled "Method and System to Assess Disease Using Dynamical Analysis of Biophysical Signals," which is incorporated by reference herein in its entirety.

Visual and Linear features (Module(s) 506). This third class of features can quantify both the morphological aspects within the waveforms of a biophysical measurement and variations therein, e.g., in cardiac/bipotential signals, ballistocardiographic signals, or photoplethysmographic signals. For photoplethysmographic signals and certain ballistocardiographic signals, morphological aspects may be assessed of waveforms in velocity-photoplethysmographic (VPG) and acceleration-photoplethysmographic (APG) signals of a photoplethysmographic signal. Similarly, a first and second order derivative of an acoustics, pressure, or accelerometer signal may be performed. Examples of these morphologic linear features can include waveform amplitudes, durations, geometric topology, among other morphologies.

Table 1C provide a list of linear features in ballistocardiographic signals that can be used in the assessment of disease, abnormal conditions, or indications of either, that can be implemented in Module(s) 114a. The systolic peaks, pulse base, and minimum peak landmarks of the BCG signal can be determined as listed in Table 1C to which internal angles of a triangle defined by the landmarks may be determined a features or parameters.

TABLE 1C

| Feature Name | Feature Name |
| --- | --- |
| BCG_mean_systPeak | BCG_mean_pulseBase |
| BCG_max_systPeak | BCG_max_pulseBase |
| BCG_min_systPeak | BCG_min_pulseBase |
| BCG_std_systPeak | BCG_std_pulseBase |
| BCG_Tri1_P1angle | BCG_Tri3_P1angle |
| BCG_Tri1_P2angle | BCG_Tri3_P2angle |
| BCG_Tri1_P3angle | BCG_Tri3_P3angle |
| BCG_Tri2_P1angle | BCG_Tri2_area |
| BCG_Tri2_P2angle | BCG_Tri3_area |
| BCG_Tri2_P3angle | |

In addition, in some embodiments, Module 114a can also determine landmarks in the biophysical signals of interest, e.g., corresponding to the atrial depolarization, ventricular depolarization, ventricular repolarization, to identify corresponding data points in the ballistocardiographic signal and calculate features or parameters from such data. The atrial depolarization, ventricular depolarization, ventricular repolarization landmarks in cardiac signals may be calculated and used to identify corresponding data points in the ballistocardiographic signals. These landmarks in the ballistocardiographic signals can then be used to generate vectors based features or parameters.

Visual BCG features can include characteristics of the cardiac vectors at the ballistocardiographic signals (e.g., BCG-based maximal atrial depolarization vector (BCG_MADV), BCG-based atrial repolarization vector (BCG_ARV), BCG-based maximal ventricular depolarization vector (BCG_MVDV), BCG-based initial ventricular depolarization vector (BCG_IVDV), BCG-based terminal ventricular depolarization vector (BCG_TVDV), BCG-based maximal ventricular repolarization vector (BCG_MVRV) in the 3D phase space and within the octants (or subregions) of the 3D space. In some embodiments, visual BCG features can include characteristics of projections of the ballistocardiographic loops (AD, VD, VR) onto the three orthogonal planes and within the quadrants of the respective orthogonal plane. In some embodiments, visual features include characteristics of projections of the BCG vectors onto the three orthogonal planes and within the quadrants of the respective orthogonal plane.

Additional description of these features in the context of other biophysical signals, which can be similarly implemented for BCG signals, may be found in U.S. provisional application No. 63/236,072, entitled "Methods and Systems for Engineering Visual Features from Biophysical Signals for Use in Characterizing Physiological System," and U.S. provisional application No. 63/235,971, entitled "Methods and Systems for Engineering Photoplethysmographic-Waveform Features from Biophysical Signals for Use in Characterizing Physiological System," each of which is incorporated by reference herein in its entirety.

Power Spectral and Wavelet Features (Module(s) 508). This fourth class of features can quantify the power spectrum and frequency content of specific regions of the acquired waveform for a biophysical signal such as ballistocardiographic, cardiac, and PPG signals. The analysis may be based on power spectrum analysis and coherence (cross-spectral analysis) analysis. Features can be determined from wavelet analyses of specific regions of the biophysical signals (e.g., ventricular depolarization, ventricular repolarization, and atrial depolarization regions in cardiac/biopotential signals). Corresponding regions in the ballistocardiographic signals can be identified, extracted, and used for the BCG feature computation. In alternative embodiments, regions of analyses in the ballistocardiographic signals are calculated based on landmarks identified in the ballistocardiographic signals.

Power spectral analysis (PSA) assesses signal energy (or power) in the frequency domain by decomposing the time-series signals into their frequency components. Cross-spectral power analysis, also referred to as Coherence Spectral Analysis (CSA), assesses the measures of association between the frequency content of two or more time series. Coherence spectral analysis may be performed between two biophysical signals of the same type (e.g., between two channels of ballistocardiographic signals or between a ballistocardiographic signal and another biophysical signal as described herein).

An example feature (e.g., cohKurt_BCG) calculates the kurtosis within a distribution of calculated coherence between a first and a second BCG spectrum or between a first BCG spectrum and a PPG or cardiac signal. Another example feature (e.g., wtPwave_circularity_BCG_median) calculates the circularity of a high-power spectral region in the atrial depolarization associated regions of a BCG signal. The analysis is performed over multiple cycles to provide a distribution of the results to which the mean of the distribution can be determined.

Table 1D provides a list of power spectral features and wavelet features, respectively, that are used in the assessment of elevated LVEDP that can be implemented in Module(s) 338.

TABLE 1D

| Feature Name |
| --- |
| cohKurt_BCG |
| coherence_std_BCG |
| coherence_kurt_BCG |
| coherence_skew_BCG |
| coherence_skew_BCG |
| coherence_kurt_BCG |
| wtPwave_circularity_BCG_median |

Module 114a can pre-process the acquired ballistocardiographic signals, (ii) window the signals, and determine the power spectrum of the windowed signals as the power spectral features or parameters. Module 114a may implement a periodogram to calculate the cumulative power of a given ballistocardiographic signal using an FFT operator with a 10% cosine fraction Tukey window. Module 114a can also determine the coherence of the windowed signals as the cross-power spectral features or parameters.

Additional description of these features in the context of other biophysical signals may be found in U.S. Provisional Patent Application No. 63/235,963, entitled "Methods and Systems for Engineering Power Spectral Features from Biophysical Signals for Use in Characterizing Physiological Systems," and U.S. Provisional Patent Application No. 63/235,968, entitled "Methods and Systems for Engineering Wavelet-Based Features from Biophysical Signals for Use in Use in Characterizing Physiological Systems," each of which is incorporated by reference herein in its entirety.

Poincaré and Synchronicity Features (Module(s) 510). This fifth class of features calculates the time difference or time variability between the peaks identified within the waveforms of a biophysical signal, e.g., among ballistocardiographic signals or between ballistocardiographic signals and another biophysical signal type, and uses that calculated time difference as input to a Poincaré analysis, or statistical analysis, to quantify the signal dynamics Within the Poincaré analysis, the features can be extracted that characterize the synchronicity characteristics between the different modalities of the biophysical signals, e.g., between cardiac/biopotential signals and PPG signals.

Other features or parameters can be calculated from the ballistocardiographic signals and another biophysical signal. Examples of these features or parameters as used in the determination of elevated left end-diastolic pressure and coronary arterial disease are described in U.S. Provisional Patent Application No. 63/235,960, entitled "Method and System to Non-invasively Assess Elevated Left Ventricular End-Diastolic Pressure," U.S. Publication No. 2020-0397322, entitled "Method and System to Assess Disease Using Dynamical Analysis of Biophysical Signals," and U.S. Publication No. 2020-0397324, entitled "Method and System to Assess Disease Using Dynamical Analysis of Cardiac and Photoplethysmographic Signals," and various patent application referenced herein, each of which is incorporated by reference herein in its entirety.

BCG Synchronicity Features

FIGS. 6-8 provide a description of the synchronicity characteristics between the ballistocardiographic signals and the different modalities of the biophysical signals in accordance with an illustrative embodiment.

Figure 7A:
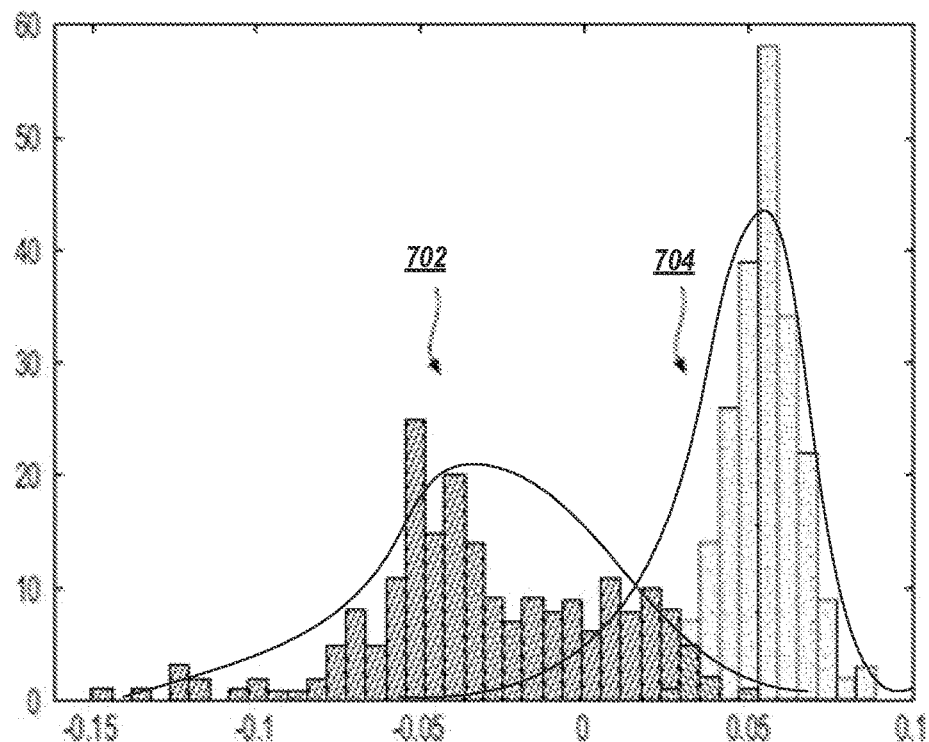
FIGS. 7A and 7B respectively shows an example histogram and Poincaré analysis of ballistocardiographic signals and/or other biophysical signals to generate ballistocardiographic-related synchronicity features or parameters.
Figure 7B:
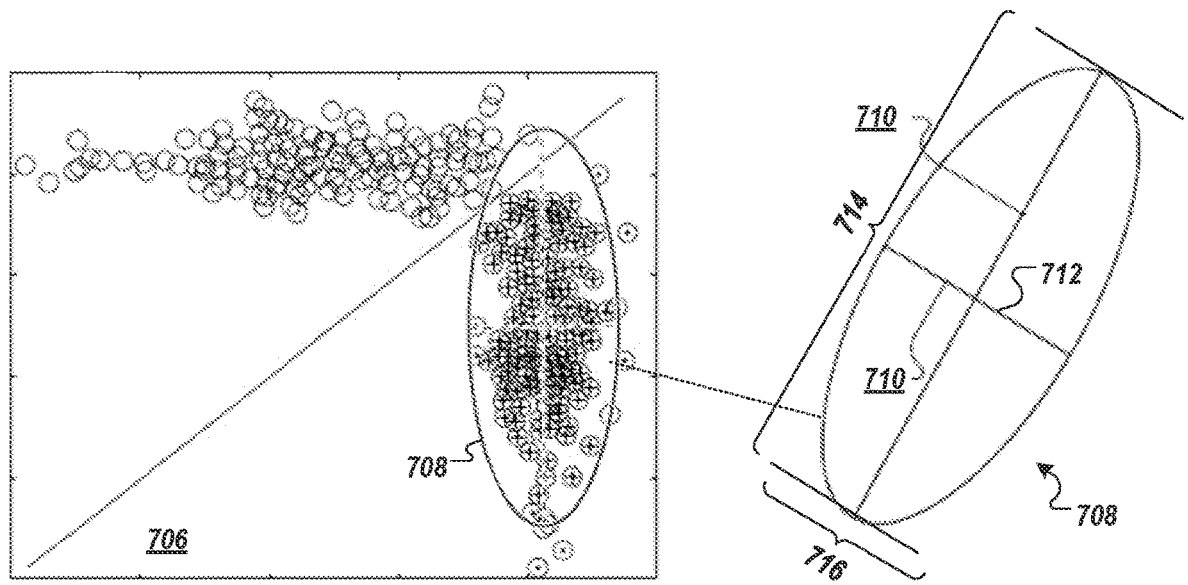
Figure 8A:
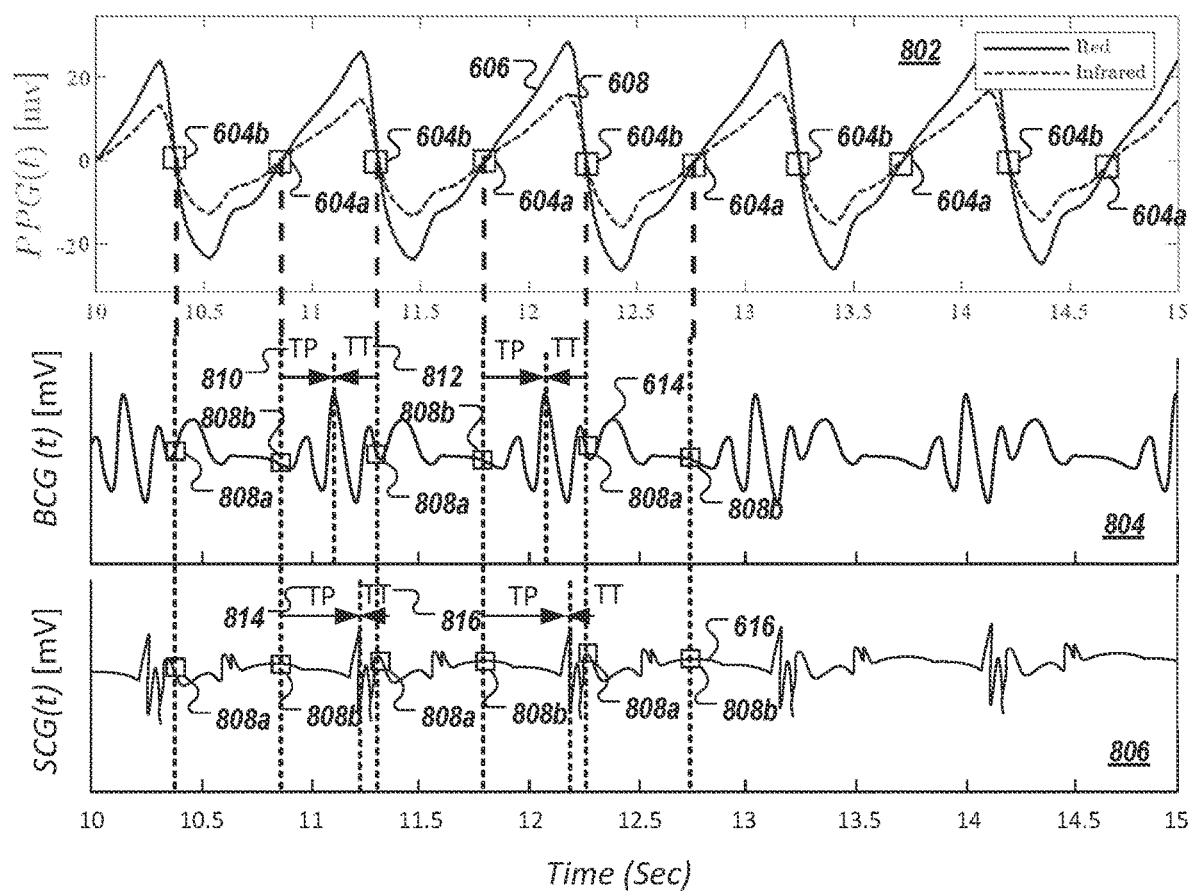
FIGS. 8A, 8B, and 8C illustrate additional sets of example synchronicity features or parameters between the acquired photoplethysmographic signal(s) and other biophysical signals in accordance with an illustrative embodiment.
Figure 8B:
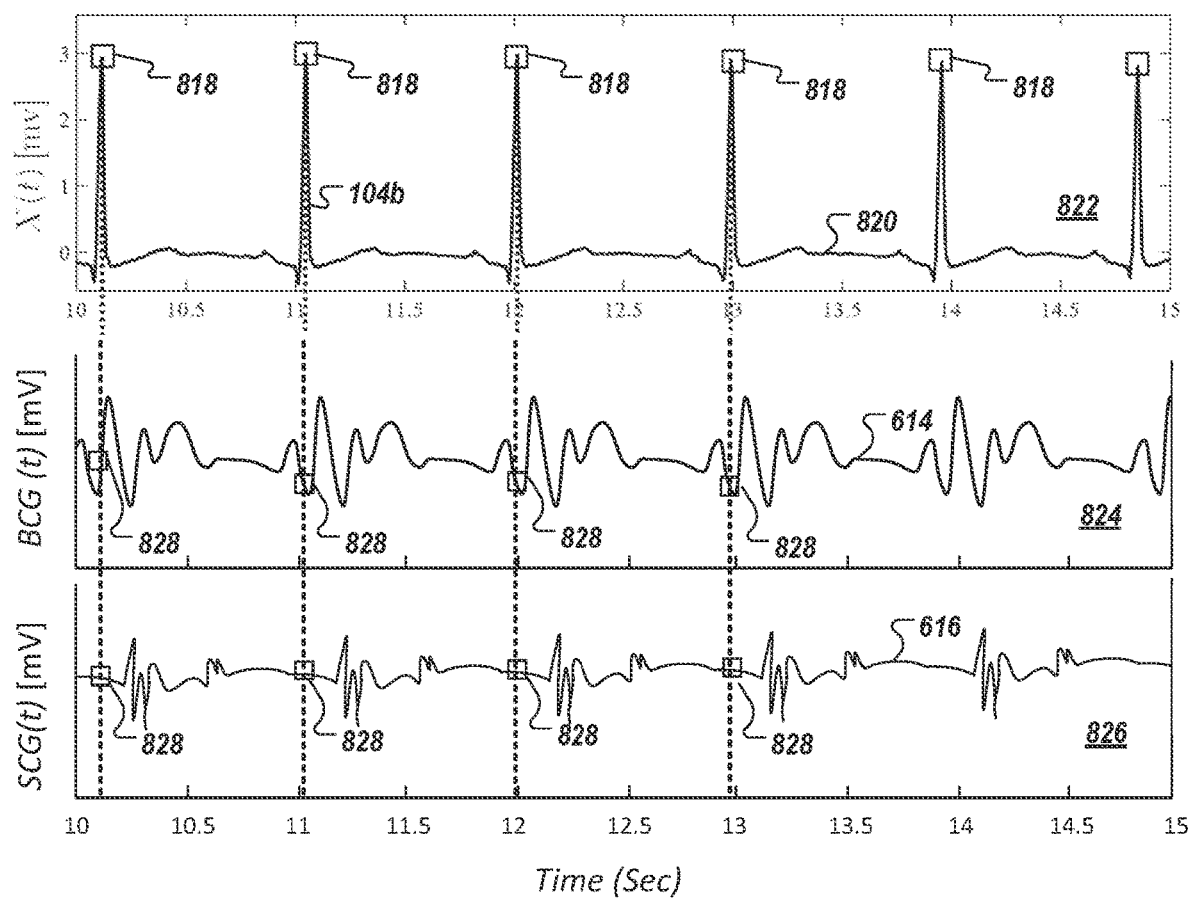
Figure 8C:
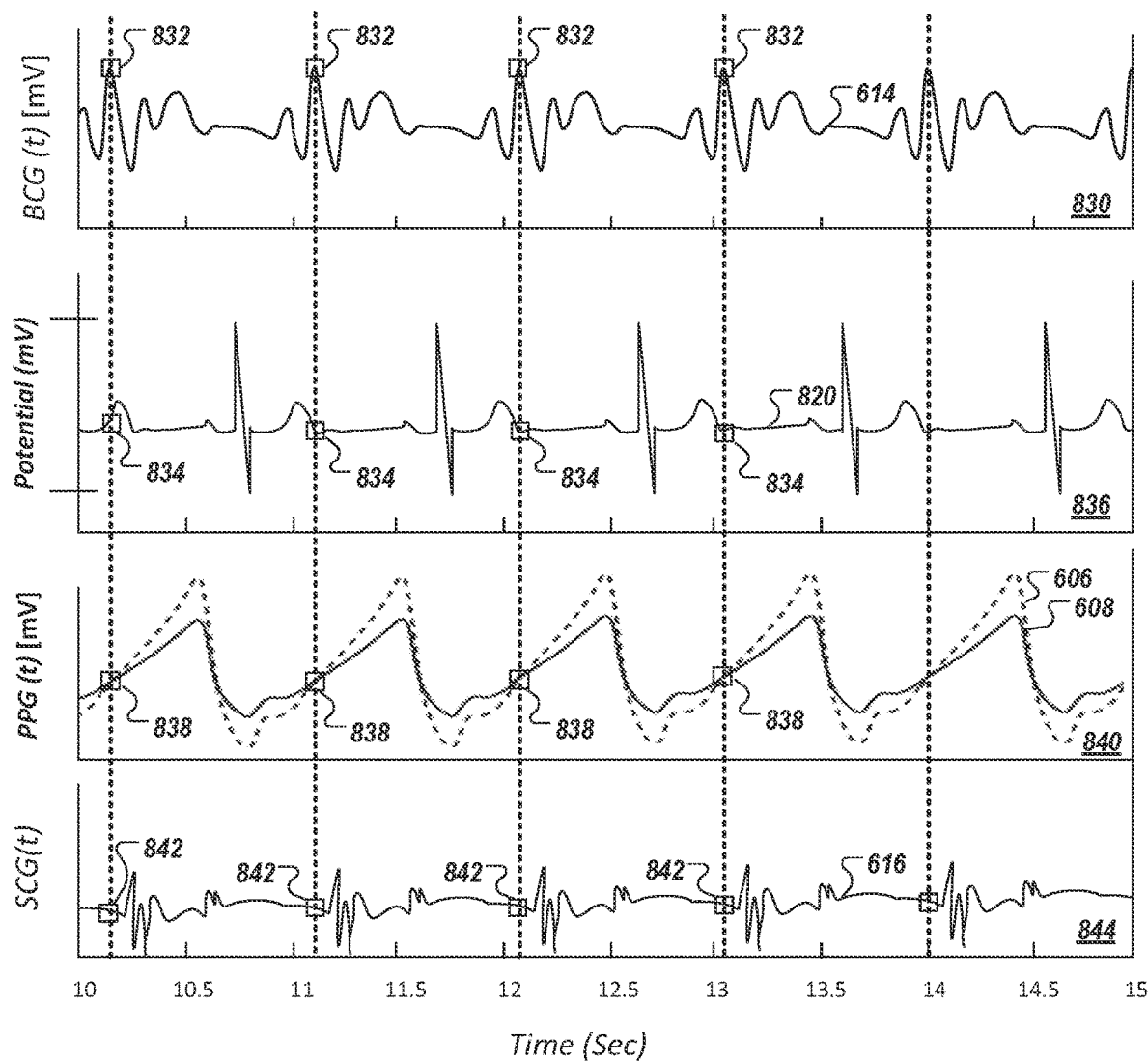

FIG. 6 shows an operation to extract ballistocardiographic signal data, e.g., comprising acoustic or pressure signals, at registration points defined by photoplethysmographic signals. FIGS. 7A-7B show Poincare map-based analysis and histogram-based analysis, analysis of the extracted data at the determined registration points of FIG. 6. FIGS. 8A, 8B, and 8C show additional examples to extract ballistocardiographic data at registration points among ballistocardiographic signals, between ballistocardiographic signals and another biophysical signal, and between one or more biophysical signals and the ballistocardiographic signal.

Synchronicity features that are based on dynamics observed in cardiac, photoplethysmographic, ballistocardiographic signals, among other biophysical signals as described herein, may encode the health state of the heart and are used to train a machine learning model for prediction for various disease states or conditions. The electrophysiological activity of the heart is a nonlinear process that, in conjunction with the myocytes' mechano-electrical feedback, produces very complex nonlinear responses [26]. These behaviors, whether normal (reaction to extrinsic conditions) or due to a disease, can be characterized using nonlinear statistics related to the nonlinear dynamics and chaoticity of the heart. In a Poincaré map, the mapping $X_{n+1}=P(X_n)$ may be defined using triggers (e.g., intersection with $\Sigma$), and the set of Poincaré points $\{X_0, X_1, \ldots, X_n\}$ can then be analyzed geometrically and/or statistically to information about the synchronicity between the physiological subsystems of the body.

FIG. 6 shows, in a first plot 602, cross-over landmarks 604a and 604b defined between a first photoplethysmographic signal 606 and a second photoplethysmographic signal 608. A second plot 610 and a third plot 612 each shows the cross-over landmarks 604a and 604b, as registration points, in relation to one of the channels of the acquired ballistocardiographic signal, e.g., comprising pressure signal 614 or acoustic signal 616, to extract values of the ballistocardiographic signal at that same point for synchronicity analysis. The second plot 610 shows the registration points of the PPG signal being used to identify data in the ballistocardiographic signal comprising a pressure measurement. The third plot 612 shows the registration points of the PPG signal being used to identify data in the ballistocardiographic signal comprising an acoustic measurement. In FIG. 6, the x-axis shows time (in seconds), and the y-axis shows the signal amplitude in millivolts (my).

FIG. 7A shows a histogram 700 of the distribution of values of the ballistocardiographic signal (e.g., 614, 616) at the cross-over landmarks (604a, 604b) of the PPG signals (e.g., 606, 608). Specifically, FIG. 7A shows distributions 702, 704 corresponding to amplitude values of the ballistocardiographic signal at the respective first and second sets of crossover landmarks (604a, 604b). In FIG. 7A, the x-axis of the histogram shows signal amplitude (in mV), and the y-axis shows the frequency/count.

Module 114a can generate a histogram (e.g., as generated per FIG. 7A) and extract statistical and geometric properties from the generated histogram. In some embodiments, the extracted histogram features include, for example, but are not limited to, modes, standard derivation, skewness, kurtosis, and mutual information. Mode refers to the set of data values that appear most often in a data set. Skewness refers to a measure of the asymmetry of the probability distribution of the data set about its mean. Kurtosis refers to the sharpness of the peak of a distribution curve. In some embodiments, mutual information is used to quantify the probabilistic dependence of the information in the acquired signals and is determined by first calculating a probability normalization of the histogram of each time series and then constructing and normalizing a 2-dimensional histogram of the two time-series data. The mutual information I(X, Y) between two random variables X and Y can be the amount of reduction in the uncertainty of one random variable, say, X given another variable Y defined per Equation 1.

$$I(X, Y) = \sum_{y \in Y} \sum_{x \in X} p(x, y) \log\left(\frac{p(x, y)}{p(x)p(y)}\right) \qquad \text{(Equation 3)}$$

In Equation 3, p(., .) is the probability distribution over the specified variables.

FIG. 7B shows another synchronicity analysis comprising a Poincaré map 706 of values of the ballistocardiographic signal (e.g., 614 or 616) at the PPG-based crossover landmarks 604a and 604b. That is, the Poincaré map records the value of the ballistocardiographic signal (e.g., 614 or 616) based on registration points defined by the photoplethysmographic crossover landmarks 604a, 604b. In FIG. 7B, the x-axis and y-axis each shows the difference in amplitude values for the cardiac signal from cycles to cycles (thus, unitless).

In some embodiments, to generate the Poincaré map 706, Module 114a can plot/generate a 2D pair of points $[x_i, x_{i+1}]$ (e.g., $(x_1, x_2)$, $(x_2, x_3)$, etc.) against the points $[x_i, x_{i-1}]$ (e.g., $(x_0, x_1)$, $(x_1, x_2)$, etc.) of the amplitude values of a ballistocardiographic signal at the cross-over landmark points formed between photoplethysmographic signals.

Following the generation of Poincaré map 706, or data object, Module 114a can generate a geometric object 708 from the mapped data. In FIG. 7B, in some embodiments, Module 114a can determine an ellipse (e.g., as data object 708) based on an ellipse fit operation of the data associated with a cluster. Based on the fitted ellipse, Module 114a can determine geometric parameters such as, but not limited to, length of semi-axis "a" (710), semi-axis "b" (712), length along a long axis (714), and length along a short axis (716) as shown in FIG. 7B. Module 114a may extract other parameters such as void area, surface area, porosity, perimeter length, density, among others. Synchronicity between acquired photoplethysmographic signals and a ballistocardiographic signal based on registration points defined in the photoplethysmographic signal may be used to assess for the presence, non-presence, severity, and/or localization (where applicable) of coronary artery disease (CAD), pulmonary hypertension, heart failure in various forms, among other diseases, conditions, or indication of such, as described herein.

Table 2A provides a list of example BCG-based synchronicity feature extracted parameters associated with Poincaré map analysis between photoplethysmographic signals and ballistocardiographic signals as their corresponding description.

synchronicity features or parameters. In FIG. 8C, the landmarks (e.g., peaks) in a ballistocardiographic signal are used as registration points to identify values in a cardiac signal, a PPG signal, and other BCG signals, to which analysis as described in relation to FIGS. 7A and 7B may be performed to generate additional BCG-based synchronicity features or parameters.

Time-difference-based BCG features. As stated above, FIG. 8A shows the crossover points in the photoplethysmographic signals that may be used to define phase differences in relation to a landmark (e.g., peaks) in the ballistocardiographic signal. In FIG. 8A, in a first plot 802, registration points (604a, 604b) comprising first and second crossover landmarks (604a, 604b) between a first photoplethysmographic signal 606 and a second photoplethysmographic signal 608 can be used to identify corresponding signal points (shown as 808a, 808b) of the ballistographic signals in the second plot 804 and the third plot 806 at the same corresponding time or data index. Plots 804 and 806 show the phase difference (shown as "TP" 810, 814 and "TT" 812, 816) of peaks identified in the ballistocardiographic signals 614 and 616, respectively. The extracted TP and TT time values are used in subsequent synchronicity dynamical

TABLE 2A

| Parameter name | Description |
|---|---|
| dBDmj, dBDmn, dBAlpha | Major diameter, minor diameter, or tile angle, of an ellipse from Poincaré map analysis for the ballistocardiographic signal (e.g., acquired near the heart or the wrist) at registration points defined by crossover points in PPG signals. |
| dBMean, dBStd, dBKurt, dBMode, dBSkew | Mean, standard deviation, kurtosis, mode, or skewness, of amplitude values of a ballistocardiographic signal (e.g., acquired near the heart or the wrist) at registration points defined by a first and second crossover point in PPG signals. |
| dBRelStdMAD | Relative difference between the standard deviation and median absolute deviation (MAD) of a distribution of the values of the ballistocardiogram signal (e.g., acquired near the heart or the wrist) at registration points defined by a first or second crossover point in PPG signals. |

FIGS. 8A, 8B, and 8C illustrate additional sets of example synchronicity features or parameters between the acquired photoplethysmographic signal(s) and other biophysical signals in accordance with an illustrative embodiment. In FIG. 8A, the crossover points, e.g., as shown in FIG. 6, may be used to define phase differences in relation to a landmark (e.g., peak) in the ballistocardiographic signal. In FIG. 8B, the landmarks (e.g., peaks) in a cardiac signal are used as registration points to identify values in the ballistographic signals to which analysis as described in relation to FIGS. 7A and 7B may be performed to generate BCG-based analysis. The x-axis shows the time domain (in the index count of the data set), and the y-axis shows the acquired amplitude of the signal in millivolts.

Table 2B provides a list of example BCG-based synchronicity features or parameters associated with a Poincaré map analysis between the photoplethysmographic and cardiac signals as well as their corresponding description. Additional BCG-based synchronicity features or parameters may be acquired.

TABLE 2B

| Parameter name | Description |
|---|---|
| dBDmjLUX12, dBDmnLUX12, dBAlphaLUX12 | Major diameter, minor diameter, or tile angle, of an ellipse from Poincaré map analysis of time intervals TT and TP values between (i) peaks in a ballistocardiographic signal (e.g., acquired near the heart or the wrist) and (ii) registration points defined by crossover points in PPG signals. |
| dBMean LUX12, dBStd LUX12, dBKurt LUX12, dBMode LUX12, dBSkew LUX12 | Mean, standard deviation, kurtosis, mode, or skewness, of time intervals TT and TP values between (i) peaks in a ballistocardiographic signal (e.g., acquired near the heart or the wrist) and (ii) registration points defined by a first and second crossover point in PPG signals. |

Cardiac Registration-Point BCG features. As noted above, FIG. 8B shows the landmarks (e.g., peaks) (818) in a cardiac signal 820 being used as registration points to identify values in the ballistographic signals, e.g., comprising pressure signal 614 and acoustic signal 616, to which analysis as described in relation to FIGS. 7A and 7B may be performed to generate BCG-based synchronicity features or parameters. In FIG. 8B, in a first plot 822, registration points comprising identified peaks 818 in the cardiac signal 820 can be used to identify values 828 of the ballistographic signals in the second plot 824 and the third plot 826 at the same corresponding time or data index. The registered values 828 are used in subsequent synchronicity dynamical analysis. The x-axis shows the time domain (in the index count of the data set), and the y-axis shows the acquired amplitude of the signals in millivolts. To identify the peaks in the cardiac signal, Module 114a may employ a peak detector, e.g., the Pan-Tompkins detector described in Tompkins W. J., Pan J., "A Real-Time QRS Detection Algorithm. IEEE Transactions on Biomedical Engineering," BME-32(3) pages 230-236 (1985).

Table 2C provides a list of example synchronicity features OR parameters associated with a Poincaré map analysis between the cardiac signal(s) and the photoplethysmographic signals as well as their corresponding description. Additional synchronicity feature extracted parameters between cardiac signals and ballistocardiogram signals may be acquired.

TABLE 2C

| Parameter name | Description |
| --- | --- |
| dBDmj_X, dBDmn_X, dBAlpha_X | Major diameter, minor diameter, or tile angle, of an ellipse from Poincaré map analysis for the ballistocardiographic signal (e.g., acquired near the heart or the wrist) at registration points defined by peaks in a cardiac signal. |
| dBMean_X, dBStd_X, dBKurt_X, dBMode_X, dBSkew_X | Mean, standard deviation, kurtosis, mode, or skewness, of amplitude values of a ballistocardiographic signal (e.g., acquired near the heart or the wrist) at registration points defined by peaks in a cardiac signal. |
| dBRelStdMAD | Relative difference between the standard deviation and median absolute deviation (MAD) of a distribution of the values of the ballistocardiogram signal (e.g., acquired near the heart or the wrist) at registration points defined by peaks in a cardiac signal.. |

BCG Registration-Point BCG features. As noted above, FIG. 8C shows the landmarks (e.g., peaks) in a ballistocardiographic signal (e.g., pressure signal 614) being used as registration points to identify values in another ballistographic signal, or other biophysical signals, to which analysis as described in relation to FIGS. 7A and 7B may be performed to generate BCG-based synchronicity features or parameters. In FIG. 8C, in a first plot 830, registration points comprising identified peaks 832 in the ballistocardiographic signal 614 can be used to identify values 834 of the cardiac signal 820 in the second plot 836, values 838 of one of the photoplethysmographic signals 606, 608 of the second plot 840, and values 842 of another ballistocardiographic signal 616 in the third plot 844 at the same corresponding time or data index. The registered values (e.g., 834, 838, 842) are used in subsequent synchronicity dynamical analysis. The x-axis shows the time domain (in index count of the data set), and the y-axis shows the acquired amplitude of the signals in millivolts.

Figure 9:
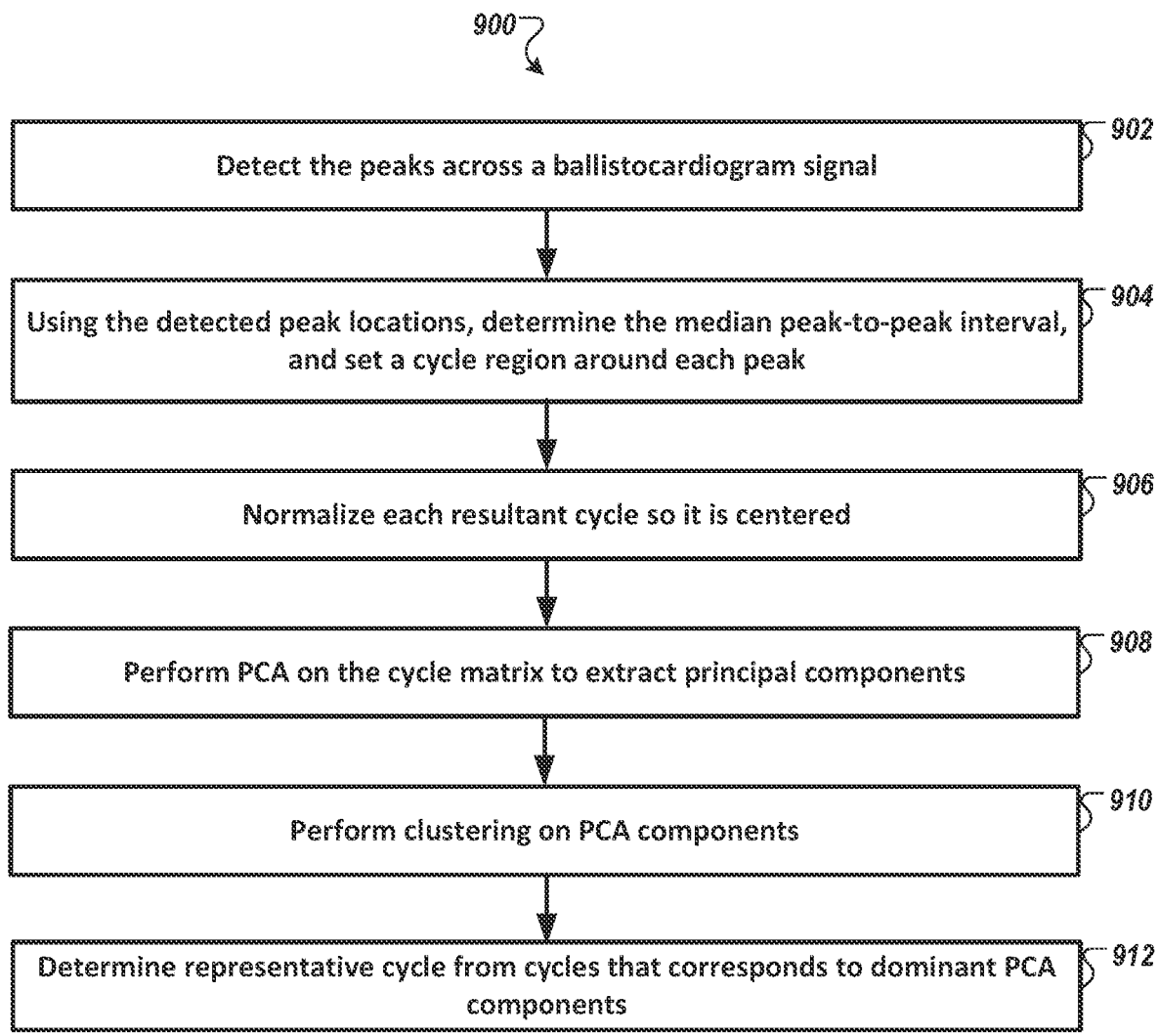
FIGS. 9 and 10 are each diagram of a method to assess or quantify skeletal-muscle-related artifact and noise contamination in a biophysical signal using ballistocardiographic signals in accordance with an illustrative embodiment.

Artifact Identification and Bi-Directional
De-Noising between Ballistocardiographic and
Cardiac Signals FIG. 9 is a diagram of a method 900 to assess or quantify skeletal-muscle-related artifact and noise contamination in a biophysical signal in accordance with an illustrative embodiment. In some embodiments, the instant system is configured to identify artifacts in a voltage gradient signal (e.g., cardiac signal 104b) related to both gross motion, recorded as both muscle activation and changes to the half-cell potential, as well as repetitive waveforms, such as that caused by respiration. Recording the ballistocardiographic signal directly at the location of each electrode allows for these motion-related artifacts to be identified within the cardiac signal. Once identified, the noise or artifact may be isolated and removed or used for additional analytical work. Indeed, the assessment or quantification may be used to determine a filtered biophysical-signal data set of a biophysical signal data set by removing an estimated motion signal (e.g., estimated gross subject's movements, estimated vibrations from the beating of the subject's heart, or estimated respiration motion or other physical movements) determined using the ballistocardiogram signal, or other biophysical signal described herein.

Furthermore, there is a direct, though non-trivial, relationship between the electrical activation of the myocytes, measured in the VGC, and the forces caused by the contraction of those myocyte cells. The VCG may therefore be used as a source of cardiac-related registration points to identify and isolate the components of the BCG that are related to cardiac forces. By using the strengths of both sources of information in conjunction in this manner, each signal may be separated into sub-components that represent isolated physiological metrics and also sources of electromechanical noise in the system.

In the example of FIG. 9, method 900 may include, first, detecting (step 802) peaks across the ballistocardiogram signal data set (e.g., 104c). Example algorithms that can be used to detect peaks in the ballistocardiogram signal data set can be used includes, but are not limited to, those described in Etemadi et al., "Wearable ballistocardiogram and seismocardiogram systems for health and performance," J Appl Physiol 124: 452-461, 2018. Etemadi, for example, discusses the use of the double integration operation to more readily identify the J peak from the noisier base BCG signal.

Method 900 includes using (step 904) the detected peak locations to determine a median peak-to-peak interval (e.g., the median maximum-to-maximum peak for a cardiac signal) and to set a cycle region around each peak (e.g., the maximum peak for the ballistocardiogram signal). For ballistocardiogram signals, the cycle region can be set around the maximum peak. Each of the cycle regions can be stored by a processor in a matrix (also referred to as a "cycle matrix"). The cycle matrix may be M×N in which M is the number of detected cycles, and N is 40% of the median peak-to-peak interval (e.g., median max-max intervals for ballistocardiogram signals) in which the 40% of the peak-to-peak interval represents the full temporal "width" of the cycle. Specifically, once the median peak-to-peak interval is known across the dataset, the signal can be divided in half, e.g., to get the "20%" that reaches both forward and backward in time from the peak (e.g., maximum peak) to capture the other waves.

Method 900 includes normalizing (step 906) each cycle to remove any offset. The normalized cardiac signal data set can have a range of "1" and "−1", though that range can vary depending on the distribution of the data. In some embodiments, the centering operation includes the operation of time-aligning the same feature (e.g., peaks) among the waveforms. Examples of these features include, for ballistocardiogram signals, an initiation of the waves, e.g., determined by a cross-correlation operation, among others.

In other embodiments, each cycle is normalized according to z-scores. Z-score value for a given data point in the template signal vector data set can be calculated as a difference between the value of the given data point and a mean of a set of cycles in which the difference is then normalized by the standard deviation of that given data point to the same indexed data value of the set of cycles.

Method 900 further includes performing, by a processor, a principal component analysis (PCA) on the generated cycle matrix to extract the first two principal components.

Method 900 further includes performing (step 910), by a processor, a clustering operation on the output of the principal component analysis. An example of a clustering operation that can be used includes the DBSCAN algorithm as described in Ester, Kriegel, Sander, Xu, "A density-based algorithm for discovering clustering in large spatial databases with noise," Proceedings of the Second International Conference on Knowledge Discover and Data Mining. Pages 226-231, which is incorporated by reference herein in its entirety. In some embodiments, the clustering operation is configured to be performed on the first two PCA components, which, in some embodiments, represent the cycles in a two-dimensional space. If the algorithm detects a second dominant cluster representing more than 10% of the total number of cycles, then that signifies the presence of a second dominant cycle morphology, such as premature ventricular contractions.

Method 900 includes extracting (step 912), by a processor, a representative cycle based on all, or some of, the cycles that correspond to the dominant PCA cluster, e.g., as detected by DBSCAN. The representative cycle may be extracted in one or several ways, each with different characteristics. In some embodiments, each of the data points in the representative cycle will embody an underlying distribution, where that distribution is composed of that timepoint in all the M cycles. For example, taking the mean (across all M points, for each N) has a low-pass filtering effect (removing both high-frequency information and noise), while taking the median preserves high-frequency information in a non-linear fashion. The differing impact of the compression technique, mean vs. median, is accounted for by varying the underlying distributions. If the M points are normally distributed, then the mean and median have the same result but start to differ with more complex distributions, such as those with non-zero skewness, and especially in combination with negative kurtosis or in the presence of multimodality.

Figure 10:
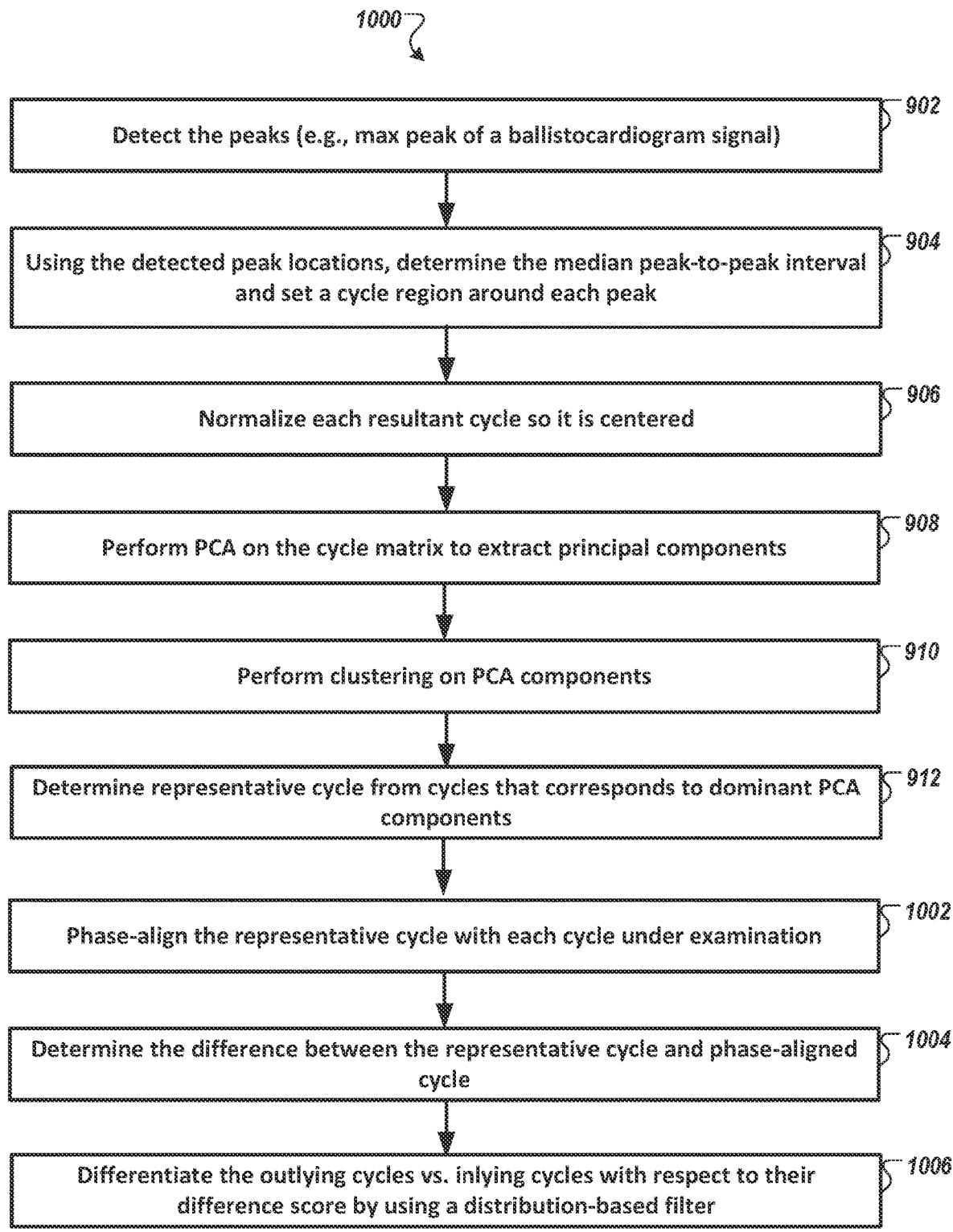

FIG. 10 is a diagram of an example method 1000 to quantify, by a processor, skeletal-muscle-related artifact noise contamination in an acquired biophysical signal in accordance with an illustrative embodiment.

Method 1000 includes steps 902-912 as discussed in relation to FIG. 9 and further includes the step of quantifying, by a processor, the distribution of differences between the determined representative cycle data set and the raw signal data set(s).

Method 1000 further includes comparing each detected cycle in the raw signal data set the cycle to the representative cycle data set. The comparison is performed by, first, phase-aligning (step 1002) the representative cycle with each of the cycles under examination. In some embodiments, a method such as finding the maximum of the cross-correlation is used.

The comparison further includes determining (step 1004) a difference between the representative cycle data set and the phase-aligned cycle under examination. In some embodiments, a method such as the correlation between the two signals is used. In other embodiments, a median absolute error is used. In yet other embodiments, a mean absolute error is used. If there is more than one representative cycle data set (as, e.g., detected through clustering on the two-dimensional PCA output), then the corresponding representative cycle data set that most matches a given cycle is used.

The comparison further includes differentiating (step 1006) outlying cycles and inlying cycles based on a difference score determined, e.g., using a distribution-based filter. In some embodiments, the distribution-based filter is configured to identify cycles having a standard deviation greater than one from the mean. In some embodiments, a plot of the distribution of difference scores is determined based on a comparison of the representative cycle data set and each of the evaluated cycles as a function of the cycle index. The inlying cycles may be identified be within one standard deviation of the mean of the distribution, and the outlying cycles are identified to be outside the one standard deviation region from the mean. A final assessment of the contamination of the biophysical signal by the skeletal-muscle-related noise can be performed by taking a representative value of the inlying difference scores, such as the mean or the median.

Experimental Results and Examples

Several development studies have been conducted to develop feature sets, and in turn, algorithms that can be used to estimate the presence or non-presence, severity, or localization of diseases, medical condition, or an indication of either. In one study, algorithms were developed for the non-invasive assessment of abnormal or elevated LVEDP. As noted above, abnormal or elevated LVEDP is an indicator of heart failure in its various forms. In another development study, algorithms and features were developed for the non-invasive assessment of coronary artery disease.

As part of these two development studies, clinical data were collected from adult human patients using a biophysical signal capture system and according to protocols described in relation to FIG. 2. The subjects underwent cardiac catheterization (the current "gold standard" tests for CAD and abnormal LVEDP evaluation) following the signal acquisition, and the catheterization results were evaluated for CAD labels and elevated LVEDP values. The collected data were stratified into separate cohorts: one for feature/algorithm development and the other for their validation.

Within the feature development phases, features were developed to extract characteristics in an analytical framework from biopotential signals (as an example of the cardiac signals discussed herein) and photo-absorption signals (as examples of the hemodynamic or photoplethysmographic discussed herein) that are intended to represent properties of the cardiovascular system. Corresponding classifiers were also developed using classifier models, linear models (e.g., Elastic Net), decision tree models (XGB Classifier, random forest models, etc.), support vector machine models, and neural network models to non-invasively estimate the presence of an elevated or abnormal LVEDP. Univariate feature selection assessments and cross-validation operations were performed to identify features for use in machine learning models (e.g., classifiers) for the specific disease indication of interest. Further description of the machine learning training and assessment are described in a U.S. provisional patent application concurrently filed herewith entitled "Method and System to Non-Invasively Assess Elevated Left Ventricular End-Diastolic Pressure", which is hereby incorporated by reference herein in its entirety.

Further development studies can be conducted to collect and evaluate the performance of BCG features, including those discussed herein.

Discussion and Additional Examples

It has been previously demonstrated that the synchronous capture and subsequent analysis of two types of biometric, the photoplethysmogram (PPG) waveform at the finger and a 3-axis bipolar voltage gradient collected about the thorax, leads to improved assessment of cardiovascular disease over the sole use of one or the other. Such analysis has been shown to have clinical utility in the assessment of coronary artery disease (CAD) as well as in abnormal left ventricular end-diastolic pressure (LVEDP), which is a marker of heart failure (HF).

The first of these biometrics, the PPG, measures waveforms associated with the flow of blood through the vascular system. It can be used to calculate measurements such as oxygen saturation, as well as estimate parameters such as blood pressure. Physiologically it can be seen that embedded in the waveform(s) will be information about the dynamic flow of blood caused by the pumping action of the heart, subsequently modified by the individual's arterial system.

The voltage gradients measured around the thorax are primarily generated by the electrical activity of the heart as each myocyte is triggered to contract and subsequently released. Physiologically it can be seen that embedded in the three-dimensional voltage gradient is information about the electronic conduction pathways available in the heart, as well as physical properties, such as myocardial tissue dimensions and scarring, that may define and impact these pathways.

The BCG measurement reflects the flow of blood through the entire body. This is most directly measured by having the subject lie on a modified bed such that the weight supported by various parts of the bed can be monitored. As blood moves back and forth in the longitudinal direction between head and feet, the volume of blood in each location will change dynamically and be reflected in the weight measured at each location on the bed. This method is, however, cumbersome, requiring a bed, and so recent research has focused on estimations of the BCG using wearable devices. The seismocardiogram (SCG) refers more specifically to the vibrations recorded by sensors mounted close to the heart. However, in practice, the term BCG is now used to cover both.

Combining the information from synchronized measurements of these three types of physiologically defined metrics, among others, can isolate and reveal information that may otherwise be hidden or inaccessible. For example, the time difference between the peak of the electrical waveform and the peak of the flow waveform will, in part, be directly related to the distance between the two points and the velocity of the blood pressure wave.

Etamadi and Inan have reviewed methods of capture, processing, and interpretation of BCG and SCG in the context of synchronously obtained ECG and PPG signals, primarily to provide estimates of pressure-related metrics, such as cardiac output, pulse transit time (PTT), and diastolic blood pressure. The exemplary system and method can generate features or parameters for machine learning from ballistocardiographic, photoplethysmographic, and cardiac time-series data, as well as other biophysical signals, to assess disease or abnormal states, or indicators of either, of the cardiovascular system and various other physiological systems described herein.

The instant system, in some embodiments, can employ a modified PSR device that is configured to synchronously measure photoplethysmographic and three-dimensional voltage gradient signals. The instant system may use these individually and in combination to generate features that are then used in machine learning campaigns to predict various cardiovascular diseases.

Whilst previous research has focused on the use of ballistocardiographic signals to estimate various cardiovascular pressure-related parameters, the instant system and associated analytical framework cover the synchronous measurement of ballistocardiographic signals using accelerometers embedded within the electrode snaps of a lead set employed to measure voltage gradients (VCG).

In some embodiment, the accelerometry data are used to assess for gross patient movements that may interfere with the collection of other data, such as the cardiac signals and/or photoplethysmographic signals. In some embodiment, the accelerometry data are used to measure the vibrations caused by the beating of the heart (SCG/BCG). In some embodiment, the accelerometry data are used to measure other physical motion parameters, including respiration, that may be used to further improve the fidelity of the cardiac signals by removing artifacts in the signal caused by, for example, changes in the half-cell potential of the electrodes.

Whilst this embodiment describes the use of embedded accelerometers to measure motion-based parameters, a similar apparatus may substitute or add other types of sensors embedded into the lead-set snaps. One such example would be an acoustic sensor employing a modified electrode capable of acting as an acoustic channel as well as an electrical conductor.

In some embodiments, a multi-axis accelerometer is enclosed within each electrode snap of a lead-set. The accelerometer is powered from the body of the recording device using ground and live conductors run through the leads. In effect, the power supply conductors are used as additional layers of EMI shielding in the lead construction. An additional signal connection is also run back to the body of the recording device through each lead.

It is contemplated that the instant system may employ sensors that are each mounted directly atop an electrode but independently powered—i.e., not connected to a central device body using a lead-set. In some embodiment, the sensors may, for example, be wirelessly synchronized and offload their data to a separate device, such as a cellphone or hub unit. Each of the three areas discussed above applies equally to acoustic signals and, therefore, the combination of any co-located, synchronized set of two or more sensor types selected from acoustic, ballistic, electrical, or magnetic sensors.

In place of an accelerometer, or in addition, a pressure sensor may be mounted within the gel of an electrode. This would measure primarily forces applied in the direction perpendicular to the surface of the skin. It would be more closely aligned with the changes in the half-cell potential of the electrode, which would provide advantages for de-noising of the cardiac signal.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although example implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, handheld devices, and wearable devices, for example.

While the methods and systems have been described in connection with certain embodiments and specific examples, it is not intended that the scope be limited to the particular embodiments set forth, as the embodiments herein are intended in all respects to be illustrative rather than restrictive. The clinical evaluation system and method discussed herein may be employed to make, or to assist a physician or other healthcare provider in making, noninvasive diagnoses or determinations of the presence or non-presence and/or severity of other diseases and/or conditions, such as, e.g., coronary artery disease, pulmonary hypertension and other pathologies as described herein using similar or other development approaches. In addition, the example clinical evaluation system and method can be used in the diagnosis and treatment of other cardiac-related pathologies and conditions as well as neurological-related pathologies and conditions, such assessment can be applied to the diagnosis and treatment (including surgical, minimally invasive, and/or pharmacologic treatment) of any pathologies or conditions in which a biophysical signal is involved in any relevant system of a living body. One example in the cardiac context is the diagnosis of CAD and other diseases and conditions disclosed herein and its treatment by any number of therapies, alone or in combination, such as the placement of a stent in a coronary artery, the performance of an atherectomy, angioplasty, prescription of drug therapy, and/or the prescription of exercise, nutritional and other lifestyle changes, etc. Other cardiac-related pathologies or conditions that may be diagnosed include, e.g., arrhythmia, congestive heart failure, valve failure, pulmonary hypertension (e.g., pulmonary arterial hypertension, pulmonary hypertension due to left heart disease, pulmonary hypertension due to lung disease, pulmonary hypertension due to chronic blood clots, and pulmonary hypertension due to other diseases such as blood or other disorders), as well as other cardiac-related pathologies, conditions and/or diseases. Non-limiting examples of neurological-related diseases, pathologies or conditions that may be diagnosed include, e.g., epilepsy, schizophrenia, Parkinson's Disease, Alzheimer's Disease (and all other forms of dementia), autism spectrum (including Asperger syndrome), attention deficit hyperactivity disorder, Huntington's Disease, muscular dystrophy, depression, bipolar disorder, brain/spinal cord tumors (malignant and benign), movement disorders, cognitive impairment, speech impairment, various psychoses, brain/spinal cord/nerve injury, chronic traumatic encephalopathy, cluster headaches, migraine headaches, neuropathy (in its various forms, including peripheral neuropathy), phantom limb/pain, chronic fatigue syndrome, acute and/or chronic pain (including back pain, failed back surgery syndrome, etc.), dyskinesia, anxiety disorders, conditions caused by infections or foreign agents (e.g., Lyme disease, encephalitis, rabies), narcolepsy and other sleep disorders, post-traumatic stress disorder, neurological conditions/effects related to stroke, aneurysms, hemorrhagic injury, etc., tinnitus and other hearing-related diseases/conditions and vision-related diseases/conditions.

In addition, the clinical evaluation system described herein may be configured to analyze biophysical signals such as an electrocardiogram (ECG), electroencephalogram (EEG), gamma synchrony, respiratory function signals, pulse oximetry signals, perfusion data signals; quasi-periodic biological signals, fetal ECG signals, blood pressure signals; cardiac magnetic field signals, heart rate signals, among others.

Further examples of processing that may be used with the exemplified method and system disclosed herein are described in: U.S. Pat. Nos. 9,289,150; 9,655,536; 9,968,275; 8,923,958; 9,408,543; 9,955,883; 9,737,229; 10,039,468; 9,597,021; 9,968,265; 9,910,964; 10,672,518; 10,566,091; 10,566,092; 10,542,897; 10,362,950; 10,292,596; 10,806,349; U.S. Patent Publication nos. 2020/0335217; 2020/0229724; 2019/0214137; 2018/0249960; 2019/0200893; 2019/0384757; 2020/0211713; 2019/0365265; 2020/0205739; 2020/0205745; 2019/0026430; 2019/0026431; PCT Publication nos. WO2017/033164; WO2017/221221; WO2019/130272; WO2018/158749; WO2019/077414; WO2019/130273; WO2019/244043; WO2020/136569; WO2019/234587; WO2020/136570; WO2020/136571; U.S. patent application Ser. Nos. 16/831,264; 16/831,380; 17/132,869; PCT Application nos. PCT/IB2020/052889; PCT/IB2020/052890, each of which has been incorporated by reference herein in its entirety.

The following patents, applications, and publications as listed below and throughout this document are hereby incorporated by reference in their entirety herein.

LIST OF REFERENCES

[1] I. Kononenko, "Machine learning for medical diagnosis: history, state of the art and perspective," Artificial Intelligence in medicine 23 (1) 89-109 (2001).

[2] B. A. Mobley, E. Schechter, W. E. Moore, P. A. McKee, J. E. Eichner, "Predictions of coronary artery stenosis by artificial neural network," Artificial Intelligence in Medicine 18 (3) 187-203 (2000).

[3] V. L. Patel, E. H. Shortliffe, M. Stefanelli, P. Szolovits, M. R. Berthold, R. Bellazzi, A. Abu-Hanna, "The coming of age of artificial intelligence in medicine," Artificial intelligence in medicine 46 (1) 5-17 (2009).

[4] V. Jahmunah, S. L. Oh, V. Rajinikanth, E. J. Ciaccio, K. H. Cheong, U. R. Acharya, et al., "Automated detection of schizophrenia using nonlinear signal processing methods," Artificial Intelligence in Medicine, Vol. 100, 101698 (September 2019).

[5] A. M. Tai, A. Albuquerque, N. E. Carmona, M. Subramanieapillai, D. S. Cha, M. Sheko, Y. Lee, R. Mansur, R. S. McIntyre, "Machine learning and big data: Implications for disease modeling and therapeutic discovery in psychiatry," Artificial Intelligence in Medicine 101704 (2019).

[6] G. K. Hansson, "Inflammation, atherosclerosis, and coronary artery disease," New England Journal of Medicine 352 (16) 1685-1695 (2005).

[7] W. G. Members, D. Lloyd-Jones, R. J. Adams, T. M. Brown, M. Carnethon, S. Dai, G. De Simone, T. B. Ferguson, E. Ford, K. Furie, et al., "Executive summary: heart disease and stroke statistics2010 update: a report from the American heart association," Circulation 121 (7) 948-954 (2010).

[8] G. A. Mensah, D. W. Brown, "An overview of cardiovascular disease burden in the united states," Health affairs 26 (1) 38-48 (2007).

[9] Y. N. Reddy, A. El-Sabbagh, R. A. Nishimura, "Comparing pulmonary arterial wedge pressure and left ventricular end diastolic pressure for assessment of left-sided filling pressures," JAMA cardiology 3 (6) 453-454 (2018).

[10] M. J. Kern, T. Christopher, "Hemodynamic rounds series II: the LVEDP," Catheterization and cardiovascular diagnosis 44 (1) 70-74 (1998).

[11] J.-H. Park, T. H. Marwick, "Use and limitations of e/e' to assess left ventricular filling pressure by echocardiography," Journal of cardiovascular ultrasound 19 (4) 169-173 (2011).

[12] S. R. Ommen, R. A. Nishimura, C. P. Appleton, F. Miller, J. K. Oh, M. M. Redfield, A. Tajik, "Clinical utility of doppler echocardiography and tissue doppler imaging in the estimation of left ventricular filling pressures: a comparative simultaneous doppler-catheterization study," Circulation 102 (15) 1788-1794 (2000).

[13] J. Allen, "Photoplethysmography and its application in clinical physiological measurement," Physiological measurement 28 (3) R1 (2007).

[14] S. D. Fihn, J. M. Gardin, J. Abrams, K. Berra, J. C. Blankenship, A. P. Dallas, P. S. Douglas, J. M. Foody, T. C. Gerber, A. L. Hinderliter, et al., "2012 accf/aha/acp/aats/pcna/scai/sts guideline for the diagnosis and management of patients with stable ischemic heart disease," Journal of the American College of Cardiology 60 (24) 2564-2603 (2012).

[15] G. N. Levine, E. R. Bates, J. C. Blankenship, S. R. Bailey, J. A. Bittl, B. Cercek, C. E. Chambers, S. G. Ellis, R. A. Guyton, S. M. Hollenberg, et al., "2011 accf/aha/scai guideline for percutaneous coronary intervention: executive summary." Journal of the American College of Cardiology 58 (24) 2550-2583 (2011).

[16] L. M. Mielniczuk, G. A. Lamas, G. C. Flaker, G. Mitchell, S. C. Smith, B. J. Gersh, S. D. Solomon, L. A. Moy'e, J. L. Rouleau, J. D. Rutherford, et al., "Left ventricular end-diastolic pressure and risk of subsequent heart failure in patients following an acute myocardial infarction," Congestive Heart Failure 13 (4) 209-214 (2007).

[17] J. J. Russo, N. Aleksova, I. Pitcher, E. Couture, S. Parlow, M. Faraz, S. Visintini, T. Simard, P. Di Santo, R. Mathew, et al., "Left ventricular unloading during extracorporeal membrane oxygenation in patients with cardiogenic shock," Journal of the American College of Cardiology 73 (6) 654-662 (2019).

[18] R. Salem, A. Denault, P. Couture, S. Belisle, A. Fortier, M.-C. Guertin, M. Carrier, R. Martineau, "Left ventricular end-diastolic pressure is a predictor of mortality in cardiac surgery independently of left ventricular ejection fraction," BJA: British Journal of Anaesthesia 97 (3) 292-297 (2006).

[19] S. H. Strogatz, "Nonlinear dynamics and chaos: with applications to physics, biology, chemistry, and engineering," CRC Press, (2018).

[20] A. L. Goldberger, D. R. Rigney, B. J. West, "Chaos and fractals in human physiology," Scientific American 262 (2) 42-49 (1990).

[21] A. L. Goldberger, "Nonlinear dynamics, fractals and chaos: applications to cardiac electrophysiology," Annals of biomedical engineering 18 (2) 195-198 (1990).

[22] L. Glass, A. Beuter, D. Larocque, "Time delays, oscillations, and chaos in physiological control systems," Mathematical Biosciences 90 (1-2) 111-125 (1988).

[23] L. Glass, "Synchronization and rhythmic processes in physiology," Nature 410 (6825) 277 (2001).

[24] M. I. Owis, A. H. Abou-Zied, A.-B. Youssef, Y. M. Kadah, "Study of features based on nonlinear dynamical modeling in ecg arrhythmia detection and classification," IEEE transactions on Biomedical Engineering 49 (7) 733-736 (2002).

[25] A. Voss, S. Schulz, R. Schroeder, M. Baumert, P. Caminal, "Methods derived from nonlinear dynamics for analysing heart rate variability, Philosophical Transactions of the Royal Society A: Mathematical," Physical and Engineering Sciences 367 (1887) 277-296 (2008).

[26] L. Glass, P. Hunter, A. McCulloch, "Theory of heart: biomechanics, biophysics, and nonlinear dynamics of cardiac function," Springer Science & Business Media, (2012).

[27] P. Billingsley, "Ergodic theory and information," Vol. 1, Wiley New York, 1965.

[28] T. Sauer, J. A. Yorke, M. Casdagli, "Embedology," Journal of statistical Physics 65 (3-4) 579-616 (1991).

[29] A. Chatterjee, "An introduction to the proper orthogonal decomposition," Current science 808-817 (2000).

[30] A. Wolf, J. B. Swift, H. L. Swinney, J. A. Vastano, "Determining Lyapunov exponents from a time series," Physica D: Nonlinear Phenomena 16 (3) 285-317 (1985).

[31] A. N. Kolmogorov, "Entropy per unit time as a metric invariant of automorphisms," Doklady of Russian Academy of Sciences, Vol. 124, pp. 754-755 (1959).

[32] P. Grassberger, I. Procaccia, "Estimation of the kolmogorov entropy from a chaotic signal," Physical review A 28 (4) 2591 (1983).

[33] J. Theiler, "Efficient algorithm for estimating the correlation dimension from a set of discrete points," Physical review A 36 (9) 4456 (1987).

[34] A. Pikovsky, J. Kurths, M. Rosenblum, J. Kurths, "Synchronization: a universal concept in nonlinear sciences," Vol. 12, Cambridge university press (2003).

[35] D. Dubin, "Rapid interpretation of EKG's: an interactive course," Cover Publishing Company (2000).
[36] F. Pedregosa, G. Varoquaux, A. Gramfort, V. Michel, B. Thirion, O. Grisel, M. Blondel, P. Prettenhofer, R. Weiss, V. Dubourg, et al., "Scikit-learn: Machine learning in python," Journal of machine learning research 12, 2825-2830 (October 2011).
[37] T. Chen, C. Guestrin, "Xgboost: A scalable tree boosting system," Proceedings of the 22nd acm-sigkdd international conference on knowledge discovery and data mining, ACM, pp. 785-794 (2016).
[38] H. Zou, T. Hastie, "Regularization and variable selection via the elastic net," Journal of the royal statistical society: series B (statistical methodology) 67 (2) 301-320 (2005).
[39] Weins et al., "Wearable Ballistocardiography: Preliminary Methods for Mapping Surface Vibration Measurements to Whole Body Forces," Conf Proc IEEE Eng Med Biol Soc. 2014: 5172-5175 (2014).
[40] Etemadi et al., "Wearable ballistocardiogram and seismocardiogram systems for health and performance," J Appl Physiol 124: 452-461, 2018.

What is claimed is:

1. A method to remove motion-associated artifacts from an acquired measurement signal, wherein the acquired measurement signal is used to non-invasively assess a cardiac disease state or abnormal cardiac condition of a subject, the method comprising:
obtaining, by one or more processors, a first biophysical signal data set of the subject comprising a first photoplethysmographic signal and a second photoplethysmographic signal-or a cardiac signal;
obtaining, by the one or more processors, a second biophysical signal data set of the subject associated with a ballistocardiogram signal, wherein the ballistocardiogram signal are temporally and spatially acquired with respect to the first photoplethysmographic signal, the second photoplethysmographic signal, or the cardiac signal;
determining, by the one or more processors, a filtered biophysical-signal data set of the first biophysical signal data set by removing an estimated motion signal determined using the ballistocardiogram signal;
determining, by the one or more processors, one or more dynamical features including a first dynamical feature and a second dynamical feature, wherein the first and second dynamical features each characterize, via a statistical-or dynamical-analysis assessment, one or more dynamical properties across multiple heart cycles of the second biophysical signal data set associated with the ballistocardiogram signal;
determining, by the one or more processors, via a trained classifier model and based, at least in part on the determined one or more dynamical features, an estimated value related to a presence or non-presence of the cardiac disease state or abnormal condition; and
in response to determining the presence of the cardiac disease state or abnormal condition, outputting, by the one or more processors and via a report and/or display, a recommended treatment for the cardiac disease state or abnormal condition, wherein the treatment is selected based on the estimated value determined via the trained classifier model.

2. The method of claim 1, wherein the estimated motion signal comprises an estimated gross movement of the subject.

3. The method of claim 2, further comprising:
determining, by the one or more processors, estimated gross subject's movements during an acquisition of the first biophysical signal data set, wherein the estimated gross subject's movement is used to reject a portion of the acquired first biophysical signal data set having the estimated gross subject's movements above a pre-defined threshold value.

4. The method of claim 1, wherein the estimated motion signal comprises assessed vibrations associated with heartbeats of the subject.

5. The method of claim 4, wherein the estimated motion signal is determined by generating a template-signal vector data set characteristic of a representative motion signal pattern of the ballistocardiogram signal.

6. The method of claim 1, wherein the estimated motion signal is used to assess a change in cell potential of respective electrodes used to acquire the cardiac signal.

7. The method of claim 1, wherein a subsequent analysis to determine the estimated value for the presence of the cardiac disease state or abnormal cardiac condition comprises:
determining, by the one or more processor, one or more synchronicity dynamical features including a first synchronicity feature and a second synchronicity feature, wherein the first and second synchronicity features each characterize, via the statistical- or dynamical-analysis assessment, the one or more synchronicity dynamical features across multiple heart cycles between (i) the first biophysical signal data set associated with the first and second photoplethysmographic signals or cardiac signal and (ii) the second biophysical signal data set associated with the ballistocardiogram signal.

8. The method of claim 7, wherein the statistical-or dynamical- analysis assessment is selected from the group consisting of:
a statistical- or dynamical-analysis assessment of values of the ballistocardiogram signal at a registration point defined by one or both the first photoplethysmographic signal and the second photoplethysmographic signal;
a statistical- or dynamical-analysis assessment of values of the ballistocardiogram signal at a registration point defined by the cardiac signal;
a statistical- or dynamical-analysis assessment of values of one of the first photoplethysmographic signal or the second photoplethysmographic signal at a landmark defined in the ballistocardiogram signal;
a statistical- or dynamical-analysis assessment of values of the cardiac signal at a landmark defined in the ballistocardiogram signal;
a statistical- or dynamical-analysis assessment of time intervals between (a) a first set of landmarks defined in the ballistocardiogram signal and (b) a second set of landmarks defined in the cardiac signal;
a statistical- or dynamical-analysis assessment of time intervals between (a) a first set of landmarks defined between the first photoplethysmographic signal and the second photoplethysmographic signal and (b) a second set of landmarks defined in the ballistocardiogram signal;
a statistical- or dynamical-analysis assessment of phase relations between (i) periods of the ballistocardiogram signal and (ii) periods of the cardiac signal; and
a statistical- or dynamical-analysis assessment of phase relations between (i) periods of one of the first or second photoplethysmographic signals and (ii) periods of the ballistocardiogram signal.

9. The method of claim 1, further comprising:
determining, by the one or more processors, a Poincaré map of the obtained biophysical signal data set;
determining, by the one or more processors, a geometric shape object of the Poincaré map; and
determining, by the one or more processors, one or more geometric properties of the geometric shape object, wherein the one or more determined geometric properties are used in the determination of the estimated value for the presence, non-presence, localization, and/or severity of the cardiac disease or condition.

10. The method of claim 1, wherein the ballistocardiogram signal is acquired via an accelerometer co-located on a sensor associated with the cardiac signal.

11. The method of claim 1, wherein the ballistocardiogram signal is acquired via an acoustic sensor co-located on a sensor associated with the cardiac signal.

12. The method of claim 1, wherein the ballistocardiogram signal is acquired via a pressure sensor co-located on a sensor associated with the cardiac signal.

13. The method of claim 1, further comprising:
obtaining, by the one or more processors, a third biophysical signal data set of the subject associated with a second ballistocardiogram signal, wherein the second ballistocardiogram signal are temporally and spatially acquired with respect to cardiac signal.

14. The method of claim 1, wherein the determined estimated value for the presence of the cardiac disease state or abnormal condition comprises an assessed indication or estimate of at least one of presence, non-presence, and severity of elevated or abnormal left ventricular end-diastolic pressure (LVEDP).

15. The method of claim 1, wherein the cardiac disease state or condition is selected from the group consisting of coronary artery disease, pulmonary hypertension, pulmonary arterial hypertension, pulmonary hypertension due to left heart disease, rare disorders that lead to pulmonary hypertension, left ventricular heart failure or left-sided heart failure, right ventricular heart failure or right-sided heart failure, systolic heart failure, diastolic heart failure, ischemic heart disease, and arrhythmia.

16. The method of claim 1, wherein determining the estimated value for the presence or non-presence of the cardiac disease state or abnormal cardiac condition comprises determining a ballistocardiographic feature or parameter that includes a quantification of dynamical characteristic including at least one of Lyapunov exponent, correlation dimension, entropy, mutual information, and correlation in relation to another biophysical signal.

17. The method of claim 1, wherein determining the estimated value for the presence or non-presence of the cardiac disease state or abnormal cardiac condition comprises determining a ballistocardiographic feature or parameter that includes a quantification of linear characteristic including at least one of peak amplitudes, peak-to-peak distances, and angles between registrations points in the ballistocardiogram signal.

18. The method of claim 1, wherein determining the estimated value for the presence or non-presence of the cardiac disease state or abnormal cardiac condition comprises determining a ballistocardiographic feature or parameter that includes a quantification of linear characteristic comprising 3D vector among the ballistocardiogram signal, a first derivative of the ballistocardiogram signal, and a second derivative of the ballistocardiogram signal.

19. The method of claim 1, wherein determining the estimated value for the presence or non-presence of the cardiac disease state or abnormal cardiac condition comprises determining a ballistocardiographic feature or parameter that includes a quantification of at least one of a power spectrum, frequency content, or coherence analysis of the ballistocardiogram signal.

20. The method of claim 1, wherein the ballistocardiogram signal is acquired from a plurality of multi-axis accelerometers, wherein each of the plurality of multi-axis accelerometers is co-located to a respective first sensor of a plurality of first sensors.

21. The method of claim 20, wherein the plurality of multi-axis accelerometers and respective first sensor are integrated into a snap lead.

22. The method of claim 21, wherein the snap lead includes a wireless communication transceiver.

23. The method of claim 22, wherein the wireless communication transceiver is configured for ultra-wide-band operation.

24. A system comprising:
a processor; and
a memory having instructions stored thereon, wherein the instructions, when executed by the processor, cause the processor to: .
obtain a first biophysical signal data set of a subject comprising a first photoplethysmographic signal and a second photoplethysmographic signal or a cardiac signal;
obtain a second biophysical signal data set of the subject associated with a ballistocardiogram signal, wherein the ballistocardiogram signal are temporally and spatially acquired with respect to the first photoplethysmographic signal, the second photoplethysmographic signal, or the cardiac signal;
determine a filtered biophysical-signal data set of the first biophysical signal data set by removing an estimated motion signal determined using the ballistocardiogram signal;
determine one or more dynamical features including a first dynamical feature and a second dynamical feature, wherein the first and second dynamical features each characterize, via a statistical- or dynamical-analysis assessment, one or more dynamical properties across multiple heart cycles of the second biophysical signal data set associated with the ballistocardiogram signal;
determine, via a trained classifier model and based, at least in part on the determined one or more dynamical features, an estimated value related to a presence or non-presence of a cardiac disease state or abnormal condition; and
in response to determining the presence of the cardiac disease state or abnormal condition, output, via a report and/or display, a recommended treatment for the cardiac disease state or abnormal condition, wherein the treatment is selected based on the estimated value determined via the trained classifier model.

* * * * *